(12) United States Patent
Tezuka

(10) Patent No.: US 9,325,924 B2
(45) Date of Patent: Apr. 26, 2016

(54) SOLID-STATE IMAGE-CAPTURING DEVICE HAVING LINES THAT CONNECT INPUT UNITS AND ELECTRONIC CAMERA USING THE SAME

(71) Applicant: NIKON CORPORATION, Tokyo (JP)

(72) Inventor: Yojiro Tezuka, Yokohama (JP)

(73) Assignee: NIKON CORPORATION, Tokyo (JP)

(*) Notice: Subject to any disclaimer, the term of this patent is extended or adjusted under 35 U.S.C. 154(b) by 39 days.

(21) Appl. No.: 14/381,050

(22) PCT Filed: Feb. 27, 2013

(86) PCT No.: PCT/JP2013/055212
§ 371 (c)(1),
(2) Date: Nov. 5, 2014

(87) PCT Pub. No.: WO2013/129512
PCT Pub. Date: Sep. 6, 2013

(65) Prior Publication Data
US 2015/0116558 A1 Apr. 30, 2015

(30) Foreign Application Priority Data
Feb. 28, 2012 (JP) ................................. 2012-042293

(51) Int. Cl.
*H04N 5/378* (2011.01)
*H04N 5/374* (2011.01)
*H04N 5/365* (2011.01)

(52) U.S. Cl.
CPC .............. *H04N 5/378* (2013.01); *H04N 5/3658* (2013.01); *H04N 5/374* (2013.01)

(58) Field of Classification Search
None
See application file for complete search history.

(56) References Cited

U.S. PATENT DOCUMENTS

| | | |
|---|---|---|
| 2001/0012070 A1 | 8/2001 | Enod et al. |
| 2003/0117510 A1 | 6/2003 | Sakurai et al. |

(Continued)

FOREIGN PATENT DOCUMENTS

| | | |
|---|---|---|
| JP | U-2-60368 | 5/1990 |
| JP | A-2003-198949 | 7/2003 |

(Continued)

OTHER PUBLICATIONS

Jun. 2, 2015 Office Action issued in Japanese Patent Application No. 2012-042293.

(Continued)

*Primary Examiner* — Justin P Misleh
(74) *Attorney, Agent, or Firm* — Oliff PLC

(57) ABSTRACT

A solid-state image-capturing device includes: plurality of pixels arranged in two-dimensional manner; plurality of vertical signal lines for corresponding column of the plurality of pixels, to receive a signal of the pixels of corresponding column; plurality of signal processing units process a signal of the plurality of vertical signal lines based on a ramp signal and reference voltage; first line configured as a common line connects first input units of the plurality of signal processing units to receive the ramp signal; the ramp signal is supplied to one side of the first line along a row direction; second line configured as common line connects second input units of plurality of signal processing units to receive reference voltage, the reference voltage is supplied to one side of the second line along the row direction and reference voltage is not supplied to another side of the second line along the row direction.

9 Claims, 13 Drawing Sheets

(56) References Cited

U.S. PATENT DOCUMENTS

| | | | |
|---|---|---|---|
| 2004/0027472 A1 | 2/2004 | Endo et al. | |
| 2006/0170795 A1* | 8/2006 | Higuchi | H04N 5/3575 348/241 |
| 2007/0046795 A1 | 3/2007 | Yamashita | |
| 2007/0115379 A1 | 5/2007 | Endo et al. | |
| 2008/0001802 A1* | 1/2008 | Higuchi | H04N 5/357 341/155 |
| 2009/0225211 A1 | 9/2009 | Oike | |
| 2009/0251578 A1 | 10/2009 | Yamashita | |
| 2010/0054407 A1 | 3/2010 | Endo et al. | |
| 2010/0259430 A1 | 10/2010 | Okamoto et al. | |
| 2010/0289933 A1 | 11/2010 | Ryoki et al. | |
| 2011/0001039 A1* | 1/2011 | Hoshino | H03M 1/144 250/208.1 |
| 2012/0086842 A1 | 4/2012 | Oike | |
| 2012/0133808 A1* | 5/2012 | Park | G01J 1/46 348/294 |
| 2012/0206608 A1 | 8/2012 | Endo et al. | |
| 2012/0212657 A1* | 8/2012 | Mo | H04N 5/378 348/300 |
| 2013/0070136 A1* | 3/2013 | Hiyama | H03M 1/08 348/300 |

FOREIGN PATENT DOCUMENTS

| | | |
|---|---|---|
| JP | A-2005-348324 | 12/2005 |
| JP | A-2008-11284 | 1/2008 |
| JP | A-2008-98722 | 4/2008 |
| JP | A-2009-224524 | 10/2009 |
| JP | A-2010-251914 | 11/2010 |
| JP | A-2010-263661 | 11/2010 |
| JP | A-2013-65970 | 4/2013 |

OTHER PUBLICATIONS

International Search Report issued in PCT/JP2013/055212 mailed Apr. 23, 2013.

Dec. 22, 2015 Decision of Refusal issued in Japanese Patent Application No. 2012-042293.

* cited by examiner

SOLID-STATE IMAGE-CAPTURING DEVICE HAVING LINES THAT CONNECT INPUT UNITS AND ELECTRONIC CAMERA USING THE SAME

TECHNICAL FIELD

The present invention relates to a solid-state image-capturing device and an electronic camera using the solid-state image-capturing device.

BACKGROUND ART

FIG. 3 of patent document 1 listed below discloses the configuration of a "CDS circuit 3a" that corresponds to a single column of a "pixel unit 20".

The "CDS circuit 3a" is provided with a "sample and hold switch sw1" that controls the input of the image signal output from the "pixel unit 20". One end of a "capacitor (sample and hold capacitor) C31" for holding the image signal is connected to the output side of the "sample and hold switch sw1". Furthermore, a "ramp signal supply source 31a" is connected to the other end of the "capacitor C31", which is the end opposite to the end connected to the "sample and hold switch sw1". The "ramp signal supply source 31a" supplies a ramp signal for changing the electric potential of the image signal held by the "capacitor C31".

Furthermore, a "node n1" that connects the "sample and hold switch sw1" and the "capacitor C31" is connected to the non-inverting input terminal of a "differential amplifier 33a". Moreover, a "capacitor C32" is provided between the inverting input terminal and the GND. A "clamp switch sw2" is provided between the output terminal of the "differential amplifier 33a" and a "connection node n2" that connects the inverting input terminal and the "capacitor C32".

CITATION LIST

Patent Literature

Patent document 1: Japanese Laid Open Patent Application No. 2008-11284

SUMMARY OF INVENTION

Technical Problem

In a case in which the "CDS circuit 3a" is provided to each column of the "pixel unit 20", a single common "ramp signal supply source 31a" is provided to each "CDS circuit 3a" provided for each column. The ramp signal input end of the "capacitor C31" of the "CDS circuit 3a" of each column is connected with those of the other columns via the first line (wiring) configured as a single common line. Furthermore, one end of the first line is connected to the "ramp signal supply source 31a". The GND voltage input end (one electrode) of the "capacitor C32" of the "CDS circuit 3a" of each column is connected with those of the other columns via a common second line (wiring), and the GND voltage is supplied to the second line as a reference voltage. With such an arrangement, based on common knowledge with respect to the GND voltage supply method in electric circuit design for improving tolerance for noise, both ends of the aforementioned second line are respectively grounded in order to provide the GND voltage to as many points of the second line as possible. In a case in which both ends of the second line are grounded, such an arrangement reduces noise that occurs in the second line due to disturbance or the like as compared with an arrangement in which the GND voltage is supplied to only one end of the second line, thereby providing the second line with improved noise tolerance.

However, as a result of investigation by the present inventor, it has been found that such an arrangement for improved noise tolerance of the second line becomes a cause of increasing the effect of noise appearing in the processed image. Detailed description will be made regarding this problem in a description of a comparison example for the present invention.

The present invention has been made in view of such a situation. The present invention provides a solid-state image-capturing device which is capable of reducing noise effects so as to acquire an image with improved image quality, and an electronic camera employing such a solid-state image-capturing device.

According to the 1st aspect of the present invention, a solid-state image-capturing device comprises: a plurality of pixels arranged in a two-dimensional manner; a plurality of vertical signal lines each provided for a corresponding column of the plurality of pixels, and each configured to receive a signal from pixels of a corresponding column; a plurality of signal processing units each configured to process a signal of one of the plurality of vertical signal lines based on a ramp signal and a reference voltage; a first line configured as a common line that connects first input units of the plurality of signal processing units each configured to receive the ramp signal, and configured such that the ramp signal is supplied to one side of the first line along a row direction; a second line configured as a common line that connects second input units of the plurality of signal processing units each configured to receive the reference voltage, and configured such that the reference voltage is supplied to one side of the second line along the row direction and the reference voltage is not supplied to another side of the second line along the row direction.

According to the 2nd aspect of the present invention, in the solid-state image-capturing device according to the 1st aspect, each of the signal processing units comprises a comparator that performs comparison processing based on the ramp signal and the reference voltage.

According to the 3rd aspect of the present invention, in the solid-state image-capturing device according to the 2nd aspect: the comparator includes an operational amplifier; and each of the signal processing units comprises a sampling switch that is connected to a non-inverting input terminal of the comparator, and that samples a signal of the vertical signal line or a signal corresponding thereto, a first capacitor one electrode of which is connected to the non-inverting input terminal and another electrode of which functions as the first input unit, a second capacitor one electrode of which is connected to an inverting input terminal of the comparator and another electrode of which functions as the second input unit, and a feedback switch that connects and disconnects the inverting input terminal and an output terminal of the comparator.

According to the 4th aspect of the present invention, in the solid-state image-capturing device according to the 3rd aspect: (i) in a first period in which the signals of the plurality of vertical signal lines are each configured as a reference signal, and the sampling switch and the feedback switch of each of the signal processing units are turned off at the same time after being temporarily turned on at the same time, the ramp signal gradually changes; (ii) in a second period after the first period, in which the signals of the plurality of vertical signal lines are each configured as a light signal including light information obtained by photoelectric conversion provided by at least one pixel of the plurality of pixels, and the sampling switch of each of the signal processing units is turned off after being temporarily turned on while the feedback switch of each of the signal processing units is maintained off, the ramp signal gradually changes; and (iii) there is provided a time measurement unit that acquires a count value that corresponds to an elapsed time from a time point at which the ramp signal begins to change in the first period up to a time point at which a signal of an output unit of the comparator of each of the signal processing units is inverted in the first period and that acquires a count value that corresponds to an elapsed time from a time point at which the ramp signal begins to change in the second period up to a time point at which the signal of the output unit of the comparator of each of the signal processing units is inverted in the second period.

According to the 5th aspect of the present invention, in the solid-state image-capturing device according to the 4th aspect, the time measurement unit comprises: a counter that counts a clock signal from a time point at which the ramp signal begins to change in the first period, and that counts the clock signal from a time point at which the ramp signal begins to change in the second period; and storage units, each provided to each of the signal processing units, and each configured to receive the count value of the counter, to store the count value at a time point at which a signal of an output unit of the comparator is inverted in the first period, and to store the count value at a time point at which the signal of the output unit of the comparator is inverted in the second period.

According to the 6th aspect of the present invention, in the solid-state image-capturing device according to the 3rd aspect: (i) in a first period in which the signals of the plurality of vertical signal lines are each configured as a reference signal, and the sampling switch and the feedback switch of each of the signal processing units are turned off at the same time after being temporarily turned on at the same time, the ramp signal gradually changes; (ii) in a second period after the first period, in which the signals of the vertical signal lines are each configured as a light signal including light information obtained by photoelectric conversion provided by at least one pixel of the plurality of pixels, and the sampling switch of each of the signal processing units is turned off after being temporarily turned on while the feedback switch of each of the signal processing units is maintained off, the ramp signal gradually changes; and (iii) each of the signal processing units comprises a counter that acquires a count value by performing a count operation in one mode among a down mode and an up mode during a period from a time point at which the ramp signal begins to change in the first period up to a time point at which a signal of an output unit of the comparator of each of the signal processing units is inverted in the first period, and that performs a count operation starting from the count value in another mode among the down mode and the up mode during a period from a time point at which the ramp signal begins to change in the second period up to a time point at which the signal of the output unit of the comparator of each of the signal processing units is inverted in the second period.

According to the 7th aspect of the present invention, in the solid-state image-capturing device according to any one of the 3rd through 6th aspects, each of the signal processing units includes an amplifier unit between the vertical signal line and the sampling switch.

According to the 8th aspect of the present invention, in the solid-state image-capturing device according to the 7th aspect, the amplifier unit comprises: a second operational amplifier; an input capacitor connected to an inverting input terminal of the second operational amplifier; a second feedback switch that connects and disconnects the inverting input terminal of the second operational amplifier and an output terminal of the second operational amplifier; and a feedback capacitor connected between the inverting input terminal of the second operational amplifier and the output terminal of the second operational amplifier.

According to the 9th aspect of the present invention, an electronic camera comprises the solid-state image-capturing device according to any one of the 1st through 8th aspects.

Advantageous Effect of the Invention

With the present invention, such an arrangement is capable of reducing effects of noise, thereby providing a solid-state image-capturing device which is capable of acquiring an image with improved image quality and an electronic camera employing such a solid-state image-capturing device.

DESCRIPTION OF EMBODIMENTS

Description will be made below with reference to the drawings regarding a solid-state image-capturing device and an electronic camera according to the present invention.

[First Embodiment]

Figure 1:
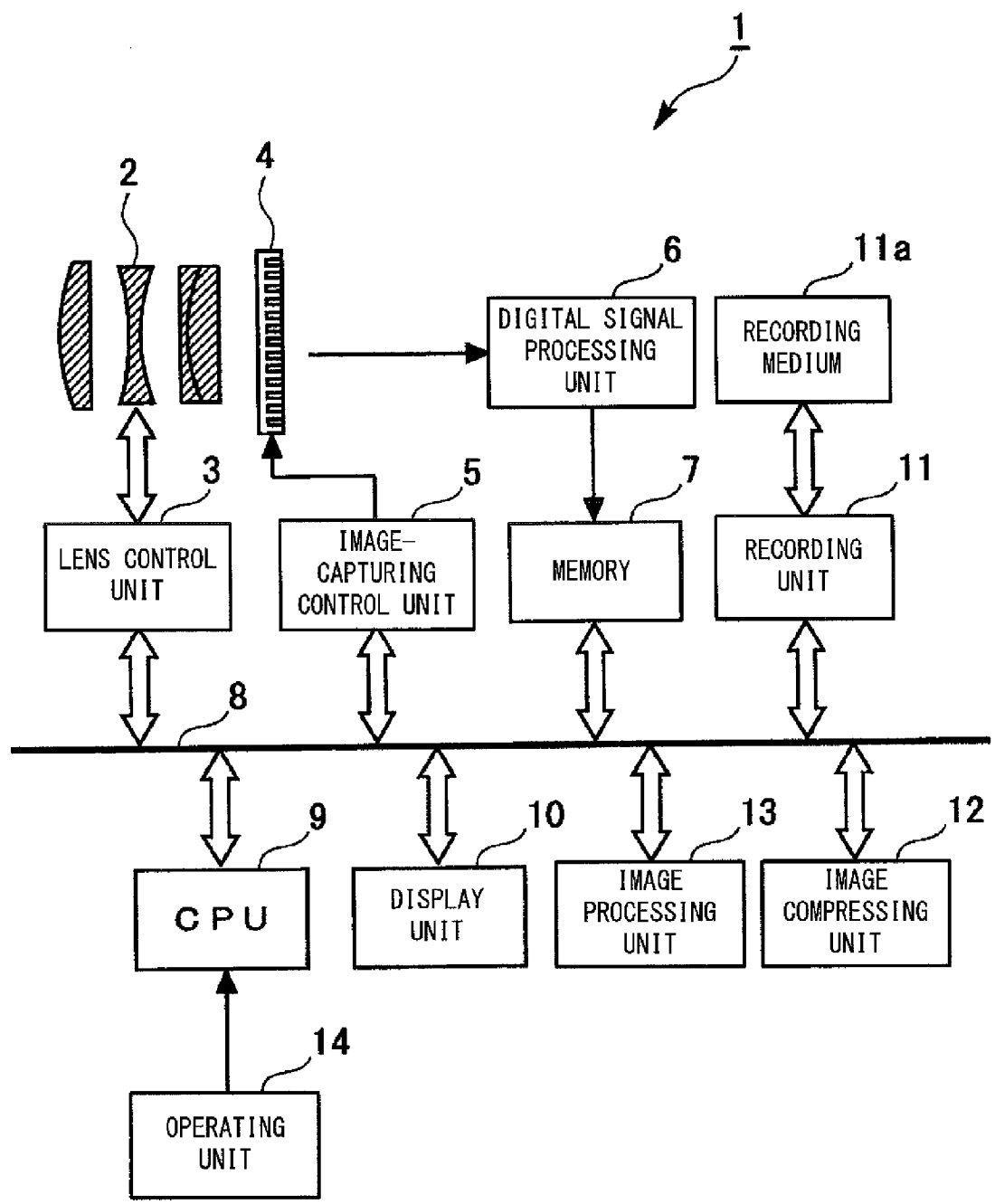
FIG. 1 is a schematic block diagram showing a schematic configuration of an electronic camera according to a first embodiment of the present invention.

FIG. 1 is a schematic block diagram showing a schematic configuration of an electronic camera 1 according to a first embodiment of the present invention.

The electronic camera 1 according to the present embodiment is configured as a digital single-lens reflex camera, for example. However, the electronic camera 1 according to the present invention is not restricted to such an arrangement. Also, the present invention is applicable to various kinds of other electronic cameras such as a compact camera, an electronic camera mounted on a cellular phone, and the like.

A taking lens 2 is mounted on the electronic camera 1. The aperture and focus of this taking lens are driven by a lens control unit 3. An image-capturing plane of a solid-state image-capturing device 4 is arranged in the image space provided by the taking lens 2.

The solid-state image-capturing device 4 is driven according to an instruction of an image-capturing control unit 5, and outputs a digital image signal. A digital signal processing unit 6 performs image processing or the like such as digital amplification, color interpolation, white balancing, etc., to the digital image signal output from the solid-state image-capturing device 4. The image signal processed by the digital signal processing unit 6 is temporarily stored in a memory 7. The memory 7 is connected to a bus 8. The lens control unit 3, the image-capturing control unit 5, a CPU 9, a display unit 10 such as a liquid crystal display panel or the like, a recording unit 11, an image compressing unit 12, an image processing unit 13, etc. are also connected to the bus 8. An operating unit 14 such as a release button or the like is connected to the CPU 9. Furthermore, a recording medium 11a is detachably mounted on the recording unit 11.

With the present embodiment, when the release button of the operating unit 14 is half-pressed, the CPU 9 included within the electronic camera 1 calculates the defocus amount based on a detection signal received from an unshown focus detection sensor, and instructs the lens control unit 3 to adjust the taking lens 2 according to the defocus amount such that the state becomes the focused state. Furthermore, the CPU 9 instructs the lens control unit 3 to adjust the taking lens 2 such that the aperture is set to a value specified by the control unit 14 beforehand. In synchronization with the operation of fully pressing the release button of the operating unit 14, the CPU 9 controls the solid-state image-capturing device 4 via the image control unit 5 so as to read out the digital image signal from the solid-state image-capturing device 4. After the image signal thus read out is processed by the digital signal processing unit 6, the image signal thus processed is temporarily stored in the memory 7. Subsequently, the CPU 9 instructs the image processing unit 13 or the image compressing unit 12 to perform desired image processing to the image signal stored in the memory 7 as necessary based on an instruction of the operating unit 14. The CPU 9 instructs the memory 7 to output the processed image signal to the recording unit 11, and records the processed image signal on the recording medium 11a.

Figure 2:
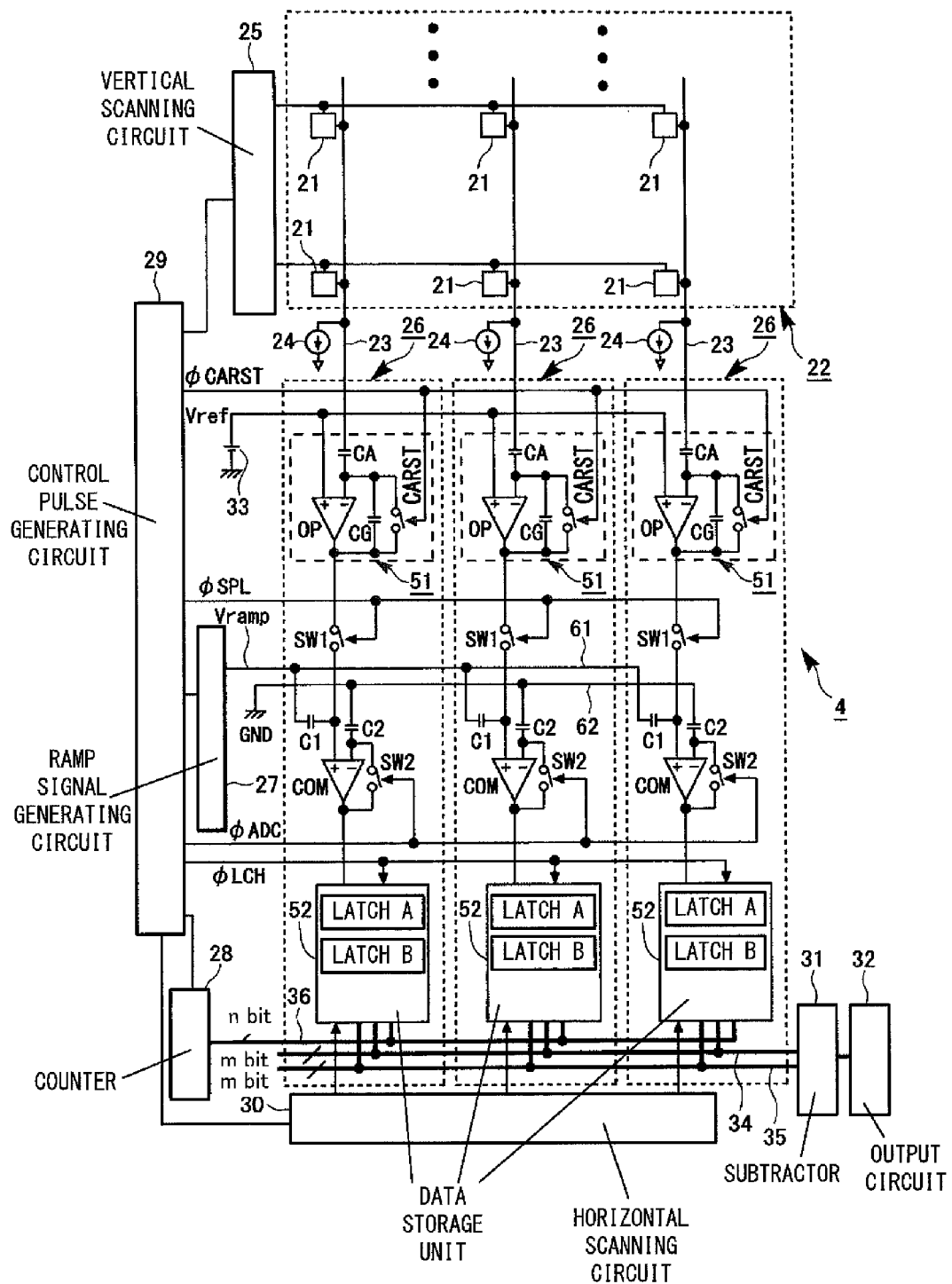
FIG. 2 is a circuit diagram showing a schematic configuration of a solid-state image-capturing device shown in FIG. 1.

FIG. 2 is a circuit diagram showing a schematic configuration of the solid-state image-capturing device 4 shown in FIG. 1. In the present embodiment, the solid-state image-capturing device 4 is configured as a CMOS solid-state image-capturing device. Also, the solid-state image-capturing device 4 may be configured as any other kinds of XY addressing solid-state image-capturing device.

As shown in FIG. 2, the solid-state image-capturing device 4 includes: a pixel array unit 22 formed of multiple pixels 21 (2×3 pixels 2 are shown in FIG. 2) arranged two-dimensionally; multiple vertical signal lines 23 each provided to a corresponding column of the multiple pixels 21, and each configured to receive a signal from the pixels 21 of the corresponding column; constant current sources 24 each provided to a corresponding vertical signal line 23; a vertical scanning circuit 25; multiple column circuits (signal processing units) 26 each configured to process a signal that passes through a corresponding line of the multiple vertical signal lines 23 according to the ramp signal Vramp and the reference voltage GND; a ramp signal generating circuit 27 that generates a ramp signal Vramp; a counter 28; a control pulse generating circuit 29; a horizontal scanning circuit 30; a subtracter 31; and an output circuit 32.

Figure 3:
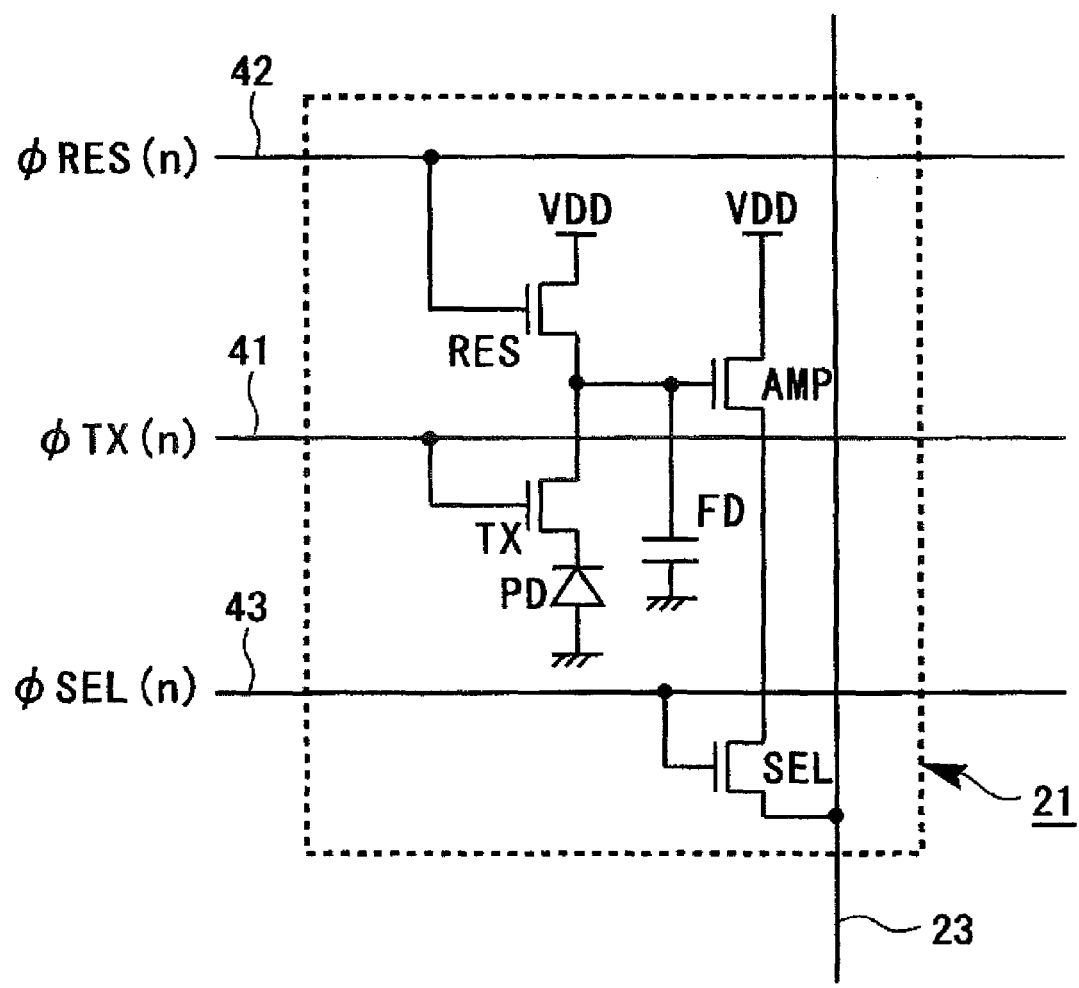
FIG. 3 is a circuit diagram showing a pixel shown in FIG. 2.

FIG. 3 is a circuit diagram showing the single pixel 21 shown in FIG. 2. As with typical CMOS image sensors, each pixel 21 includes the following, which are connected as shown in FIG. 3: a photodiode PD configured as a photoelectric conversion unit that generates charges that correspond to incident light and stores the charges thus generated; a floating diffusion FD configured as a charge/voltage conversion unit that receives the charges and that converts the charges thus received into voltage; an amplifier transistor AMP configured as an amplifier unit that outputs a signal that corresponds to the electric potential of the floating diffusion FD; a transfer transistor TX that transfers the charges from the photodiode PD to the floating diffusion FD; a reset transistor RES that resets the electric potential of the floating diffusion FD; and a selector transistor SEL configured to select a readout row. In FIG. 3, VDD represents the power supply electric potential. It should be noted that the transistors AMP, TX, RES, and SEL of each pixel 21 are each configured as an nMOS transistor.

The gates of the transfer transistors TX provided for each row are connected to a common control line 41. The vertical scanning circuit 25 supplies a control signal φTX to each control line 41 for controlling the transfer transistors TX. The gates of the reset transistors RES provided for each row are connected to a common control line 42. The vertical scanning circuit 25 supplies a control signal φRES to each control line 42 for controlling the reset transistors RES. The gates of the selector transistors SEL provided for each row are connected to a common control line 43. The vertical scanning circuit 25 supplies a control signal φSEL to each control line 43 for controlling the selector transistors SEL. In a case in which the control signals φTX should be distinguished for each row, the control signal φTX for the n-th row is represented by φTX(n). The same can be said of the control signals φRES and φSEL.

The photodiode PD of each pixel 21 generates signal charges according to the amount of light of the incident light (light from the subject). When the control signal φTX is in a high-level period, the transfer transistor TX is turned on, which transfer the charges generated by the photodiode PD to the floating diffusion FD. When the control signal φRES is in a high-level period (period in which the control signal φRES is set to the power supply potential VDD), the reset transistor RES is turned on, which resets the floating diffusion FD.

The amplifier transistor AMP is arranged such that its drain is connected to the power supply potential VDD, its gate is connected to the floating diffusion FD, and its source is connected to the drain of the selector transistor SEL, thereby providing a source follower circuit configuration with constant current sources 24 (not shown in FIG. 3; see FIG. 2) as a load. The amplifier transistor AMP outputs a readout signal to the vertical signal line 23 via the selector transistor SEL according to the voltage value of the floating diffusion FD. When the control signal φSEL is high level, the selector transistor SEL is turned on, which connects the source of the amplifier transistor AMP to the vertical signal line 23.

The vertical scanning circuit 25 outputs the control signals φSEL, φRES, and φTX, for each row of the pixels 21, so as to perform a control operation such as row addressing for the pixel array unit 22, vertical scanning, and the like, according to known techniques. Such a control operation allows each vertical signal line 23 to be supplied with output signals (analog signals) output from the pixels 2 of the corresponding column.

Figure 4:
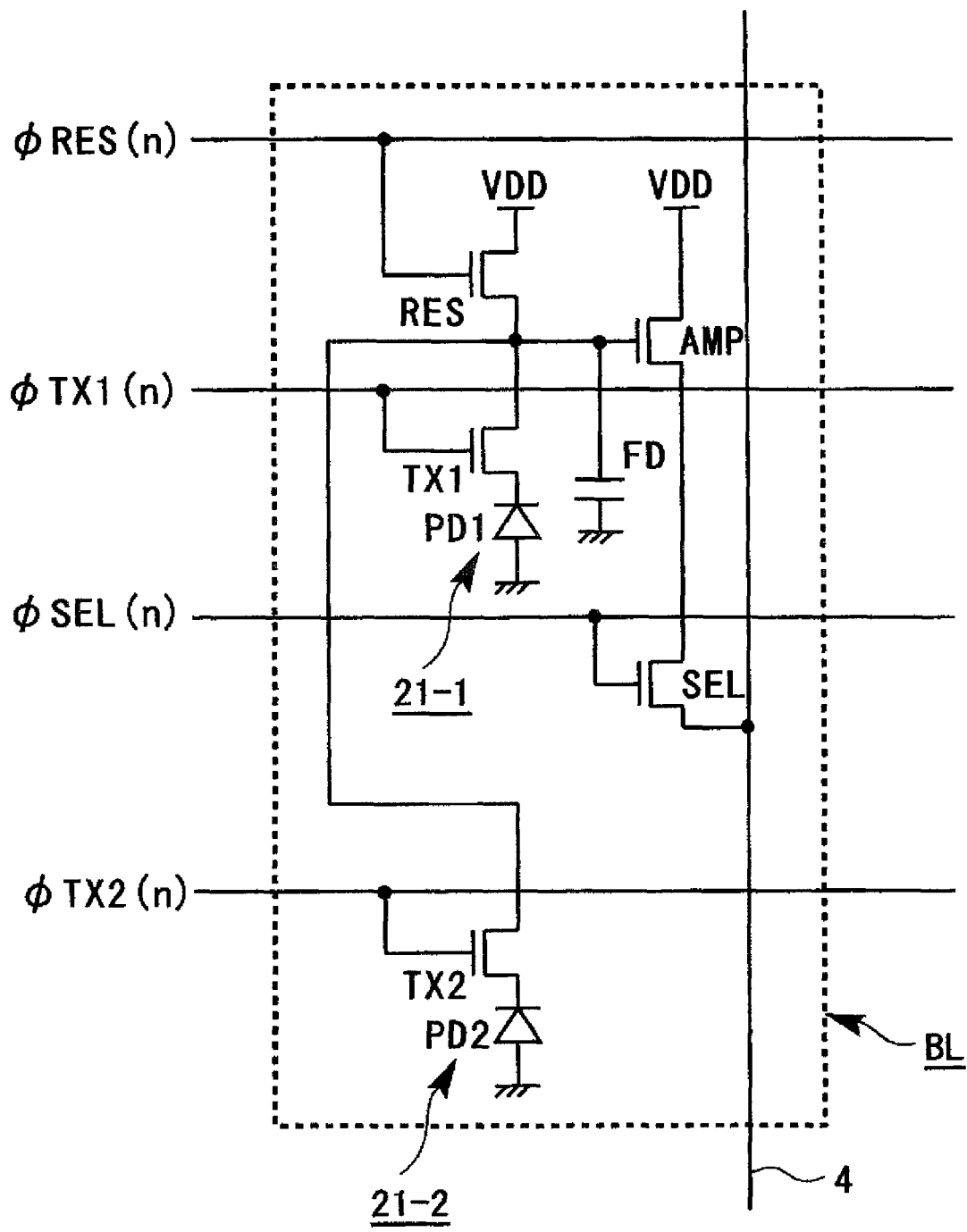
FIG. 4 is a circuit diagram showing a pixel according to a modification.

The configuration of each pixel 21 is not restricted to such a configuration described above with reference to FIG. 3. For example, as the configuration of the pixel 21, a configuration shown in FIG. 4 may be employed. FIG. 4 is a circuit diagram showing the pixel 21 according to a modification. In FIG. 4, the same components as those shown in FIG. 3, or otherwise corresponding components, are denoted by the same reference symbols, and redundant description will be omitted.

The point of difference between the configuration shown in FIG. 4 and the configuration shown in FIG. 3 is that every two pixels 21 adjacent to each other in the column direction are arranged to share a single set of the floating diffusion FD, the amplifier transistor AMP, the reset transistor RES, and the selector transistor SEL. In this modification, the vertical scanning circuit 25 is configured to output control signals φSEL, φRES, φTX1, and φTX2, instead of the control signals φSEL, φRES, and φTX.

In FIG. 4, the two pixels (21-1 and 21-2) that share a set of the floating diffusion FD, the amplifier transistor AMP, the reset transistor RES, and the selector transistor SEL, are represented as a pixel block BL. In FIG. 3, in order to allow the multiple photodiodes PD and transfer transistors TX to be distinguished, the photodiode PD and the transfer transistor TX provided for the upper pixel 21-1 are denoted by the symbols PD1 and TX1, respectively, and the photodiode PD and the transfer transistor TX provided for the lower pixel 21-2 are denoted by the symbols PD2 and TX2, respectively. Furthermore, the control signal supplied to the gate of the transfer transistor TX1 is represented by φTX1, and the control signal supplied to the gate of the transfer transistor TX2 is represented by φTX2, which allows the two control signals TX to be distinguished. It should be noted that, in FIG. 3, the symbol "n" represents a pixel row. On the other hand, in FIG. 4, "n" represents a row of the pixel blocks BL. One row of the pixel blocks BL corresponds to two rows of the pixels 21.

With such a modification, the vertical scanning circuit 25 receives a control signal from the image-capturing control unit 5 shown in FIG. 1, and outputs the control signals φSEL, φRES, φTX1, and φTX2 for each row of the pixels 21, thereby enabling the readout operation.

As with typical CMOS image sensors, the output signal output from the pixel 21 comprises: a light signal that corresponds to an information signal including predetermined information; and a dark signal that corresponds to a reference signal including a reference component to be subtracted from the information signal. The light signal is a signal including light information obtained by means of photoelectric conversion at each pixel 21. Specifically, with the present embodiment, the dark signal is a signal output from the pixel 21 when the floating diffusion FD is reset, and the light signal is a signal output from the pixel 21 when the signal charges generated by the photodiode FD is transferred to the floating diffusion FD. The light signal includes a dark signal as a superimposed signal.

Each column circuit 26 includes an amplifier unit 51. With the present embodiment, the amplifier unit 51 includes an operational amplifier (second operational amplifier) OP, an input capacity CA, a feedback capacity CG, and a clamp control switch (second feedback switch) CARST that switches on and off according to a clamp control signal φCARST. The amplifier unit 51 outputs, via the output terminal of the operational amplifier OP, an information signal and a reference signal according to a signal received via the corresponding vertical signal line 23. An electric potential supply unit 33 applies a constant electric potential Vref to the non-inverting input terminal (+ input terminal) of the operational amplifier OP. The vertical signal line 23 is connected to the inverting input terminal (− input terminal) of the operational amplifier OP via the input capacity CA. Furthermore, the feedback capacity CG and the clamp control switch CARST are connected in parallel between the inverting input terminal of the operational amplifier OP and the output terminal of the operational amplifier OP. The operational amplifier OP is configured employing a differential amplifier circuit or the like. The control input terminal of the clamp control switch CARST included in each column circuit 26 is connected to a common line. The control pulse generating circuit 29 supplies the clamp control signal φCARST to this common line. When the clamp control signal φCARST is high level, the clamp control switch CARST turns on. When the clamp control signal φCARST is low level, the clamp control switch CARST turns off.

With such an amplifier unit 51, when the signal φCARST is set to high level, the clamp control switch CARST is turned on, which creates a short circuit between the inverting input terminal and the output terminal of the operational amplifier OP, thereby clamping the output terminal of the operational amplifier OP to the predetermined electric potential Vref. Subsequently, when the φCARST signal is set to low level, which turns off the clamp control switch CARST, if the voltage at the vertical signal line 23 changes by ΔV, the signal output from the output terminal of the operational amplifier OP is represented by {Vref−(CA/CG)×ΔV}. As described above, when the control switch CARST is turned off, such an arrangement provides an inversion gain (−CA/CG) which is the ratio between the input capacitance CA and the feedback capacitance CG.

As described later, the signal φCARST is temporarily set to high level for a predetermined period of time, and while the dark signal is output to the vertical signal line 23, the signal φCARST is returned to low level. Subsequently, the light signal is output to the vertical signal line 23. In the following description, the output signal of the operational amplifier OP output while the dark signal is output to the vertical signal line 23 and when the signal φCARST is returned to low level will also be referred to as the "dark signal". In this state, the output signal and the electric potential of the operational amplifier OP are represented by Vd. On the other hand, the output signal of the operational amplifier OP output while the light signal is output to the vertical scanning circuit 25 after the aforementioned operation will be referred to as the "light signal". In this state, the output signal and the electric potential of the operational amplifier OP are represented by Vs.

The components of each column circuit 26 other than the amplifier unit 51 form an AD converter together with the ramp signal generating circuit 27 and the counter 28. The ramp signal generating circuit 27 and the counter 28 are each provided for all the columns as common components. Thus, with the present embodiment, a single AD converter is provided for each vertical signal line 23. However, the ramp signal generating circuit 27 and the counter 28, which are components of each AD converter, are shared by all the AD converters. Description will be made later regarding the configuration and the operation of the AD converter.

The horizontal scanning circuit 30 supplies a control signal used for a horizontal scanning operation to a data storage unit 52 of the column circuit 26 for each column as described later. Thus, the horizontal scanning circuit 30 sequentially transmits a first digital value and a second digital value (count values respectively stored in latches A and B configured as separate storage areas provided to the data storage unit 52 included in each column circuit 26), each of which is obtained as a m-bit signal by means of the corresponding AD converter, to a subtracter 31 via the first and second horizontal signal lines 34 and 35. The subtracter 31 calculates the difference between the first and second digital values thus received, acquires an m-bit digital value that represents the difference thus calculated, and transmits the m-bit digital value thus acquired to the output circuit 32. The output circuit 32 performs parallel/serial conversion of the digital value thus received, and outputs it to an external circuit (digital signal processing unit 6 shown in FIG. 1) as an serial digital signal, for example.

The control pulse generating circuit 29 generates a clock signal and a timing signal necessary for the operation of each component such as the vertical scanning circuit 25, the AD converter, the horizontal scanning circuit 30, and the like, according to an unshown master clock received from the image-capturing control unit 5 shown in FIG. 1, and supplies such signals to the corresponding circuit component.

The solid-state image-capturing device 4 according to the present embodiment performs the same basic operations as those of typical CMOS image sensors according to conventional techniques, except for the configuration and functions of the AD converter (which is formed of the ramp signal generating circuit 27, the counter 28, and the components of the column circuit 26 other than the amplifier unit 51) shown in FIG. 2.

The ramp signal generating circuit 27 generates a ramp signal Vramp as described later with reference to FIG. 6, based on the signal received from the control pulse generating circuit 29. The configuration of the ramp signal generating circuit 27 is not restricted in particular. For example, the ramp signal generating circuit 27 may be configured employing a DA converter that performs DA conversion of the count value output from the counter 28. Also, various kinds of known configurations may be employed.

The counter 28 starts and stops the count operation according to an instruction received from the control pulse generating circuit 29. In the count operation, the counter 28 counts the clock signal received from the control pulse generating circuit 29, and supplies the n-bit count value to the data storage unit 52 included in each column circuit 26 via an n-bit signal line 36.

Each column circuit 26 includes a comparator COM that performs comparison processing based on the ramp signal Vramp and the reference voltage GND. The comparator COM consists of an operational amplifier. Each column circuit 26 includes: a sampling switch SW1 connected to the non-inverting input terminal of the comparator COM and configured to sample an output signal (signal that corresponds to a light signal 3 acquired by the vertical scanning circuit 25) output from the operational amplifier OP of the amplifier unit 51; a first capacitor C1 arranged such that its one electrode is connected to the non-inverting input terminal of the comparator COM and the other electrode thereof is supplied with the ramp signal Vramp; a second capacitor C2 arranged such that its one electrode is connected to the inverting input terminal of the comparator COM and the other electrode thereof is supplied with the reference voltage GND; and a feedback switch SW2 that switches on and off the connection between the inverting input terminal of the comparator COM and the output terminal of the comparator.

With the present embodiment, the aforementioned other electrode of the first capacitor C1 included in each column circuit 26 functions as a first input terminal of the column circuit 26 configured to receive the ramp signal Vramp as an input signal. The aforementioned other electrode (first input terminal) of the first capacitor C1 included in each column circuit 26 is connected together via a common first line (wiring) 61, to which the ramp signal Vramp is supplied from the ramp signal generating circuit 27. Furthermore, the aforementioned other electrode of the second capacitor C2 included in each column circuit 26 functions as a second input terminal of the column circuit 26 configured to receive the reference voltage GND as an input signal. The aforementioned other electrode (second input terminal) of the second capacitor C2 included in each column circuit 26 is connected together via a common second line (wiring) 62, to which the reference voltage GND is supplied. With the present embodiment, the ground voltage GND is supplied as the reference voltage. Also, a different constant electric potential may be supplied as the reference voltage. Detailed description will be made later regarding the first and the second lines 61 and 62, and regarding the supply of the ramp signal Vramp and the reference voltage GND thereto.

The control input terminals of the sampling switches SW1 of the respective circuits 26 are connected to a common line, to which the control pulse generating circuit 29 supplies a control signal φSPL. When the control signal φSPL is high level, the sampling switch SW1 is turned on, and when the control signal φSPL is low level, the sampling switch SW1 is turned off.

The control input terminals of the feedback switches SW2 of the respective column circuits 26 are connected to a common line, to which the control pulse generating circuit 29 supplies a control signal φADC. When the control signal φADC is high level, the feedback switch SW2 is turned on, and when the control signal φADC is low level, the feedback switch SW2 is turned off.

Each column circuit 26 includes a data storage unit 52. The data storage unit 52 includes n-bit latches A and B each configured as a separate internal storage area. The data storage unit 52 receives the output signal Vout of the comparator COM as a latch instruction signal. When the output signal Vout of the comparator COM is inverted, the data storage unit 52 latches the count value supplied from the counter 28 via the signal line 36. In this stage, when the output signal Vout is inverted, the data storage unit 52 instructs the latch A to latch the count value that corresponds to a first period t11 to t12 described later with reference to FIG. 6, or otherwise instructs the latch B to store the count value that corresponds to a second period t17 to t18 described later with reference to FIG. 6, according to a control signal φLCH (configured as a selection signal that indicates which latch among the latches A and B is to be used to store the count value) received from the control pulse generating circuit 29.

Figure 6:
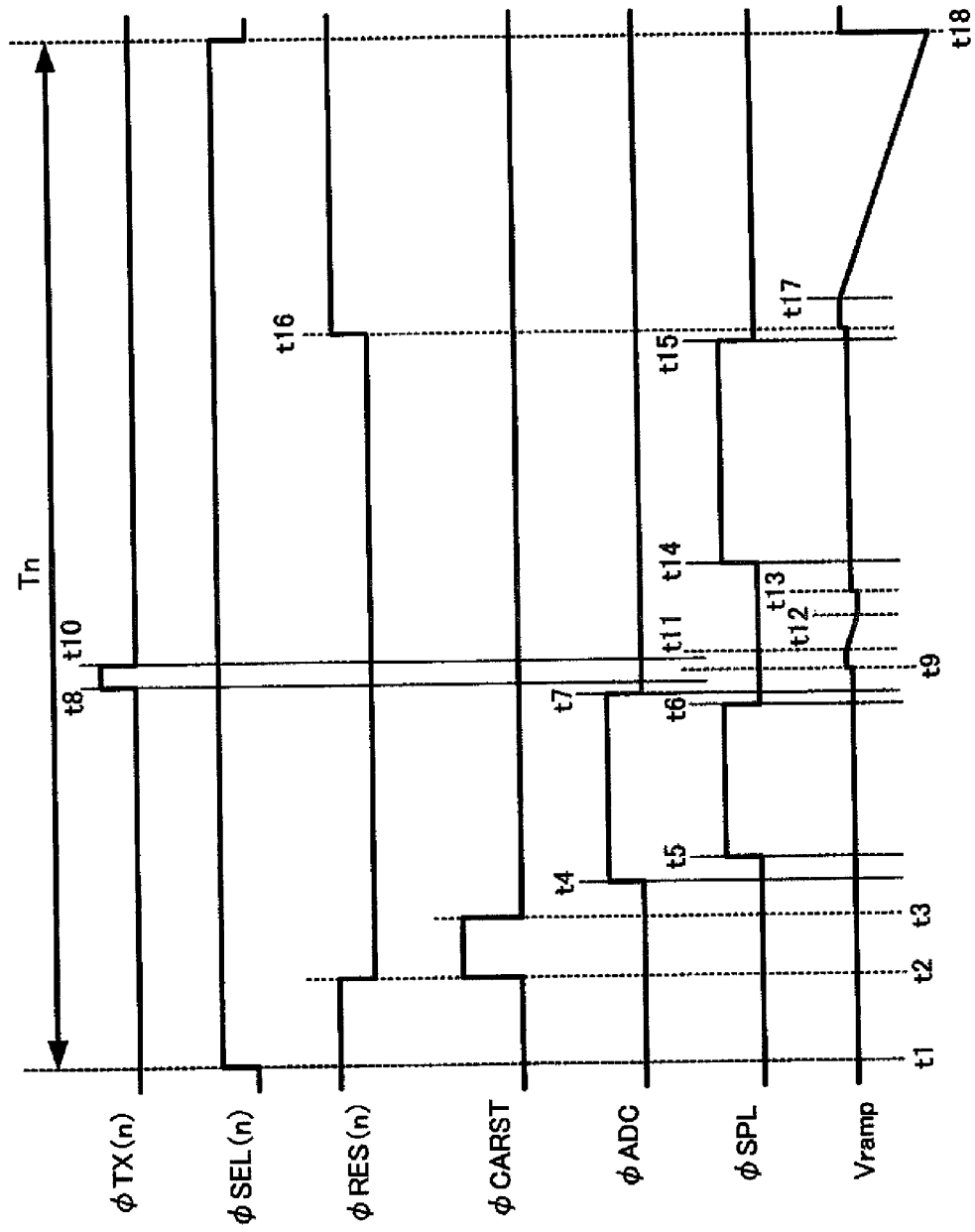
FIG. 6 is a timing chart showing the operation in a predetermined period shown in FIG. 5.

The counter 28 starts a count operation from the time point t11 in the first period t11 to t22 shown in FIG. 6, when the ramp signal Vramp starts changing, according to an instruction received from the control pulse generating circuit 29. Furthermore, the counter 28 starts the count operation from time point t17 in the second period t17 to t18 shown in FIG. 6, when the ramp signal Vramp starts changing, according to an instruction received from the control pulse generating circuit 29. Thus, the count value stored in each of the latch A and B of the data storage unit 52 represents the elapsed time from the time point t11 and t17 up to the time point at which the output signal Vout of the comparator COM is inverted respectively. As described above, the data storage unit 52 and the counter 28 form a time measurement unit that acquires the count value that corresponds to the elapsed time. When the data storage unit 52 receives a control signal from the horizontal scanning circuit 30, the data storage unit 52 converts the count values respectively stored in the latches A and B into respective m-bit digital values, and transmits the respective m-bit digital values thus converted to the subtractor 31 via the horizontal signal lines 34 and 35.

Figure 5:
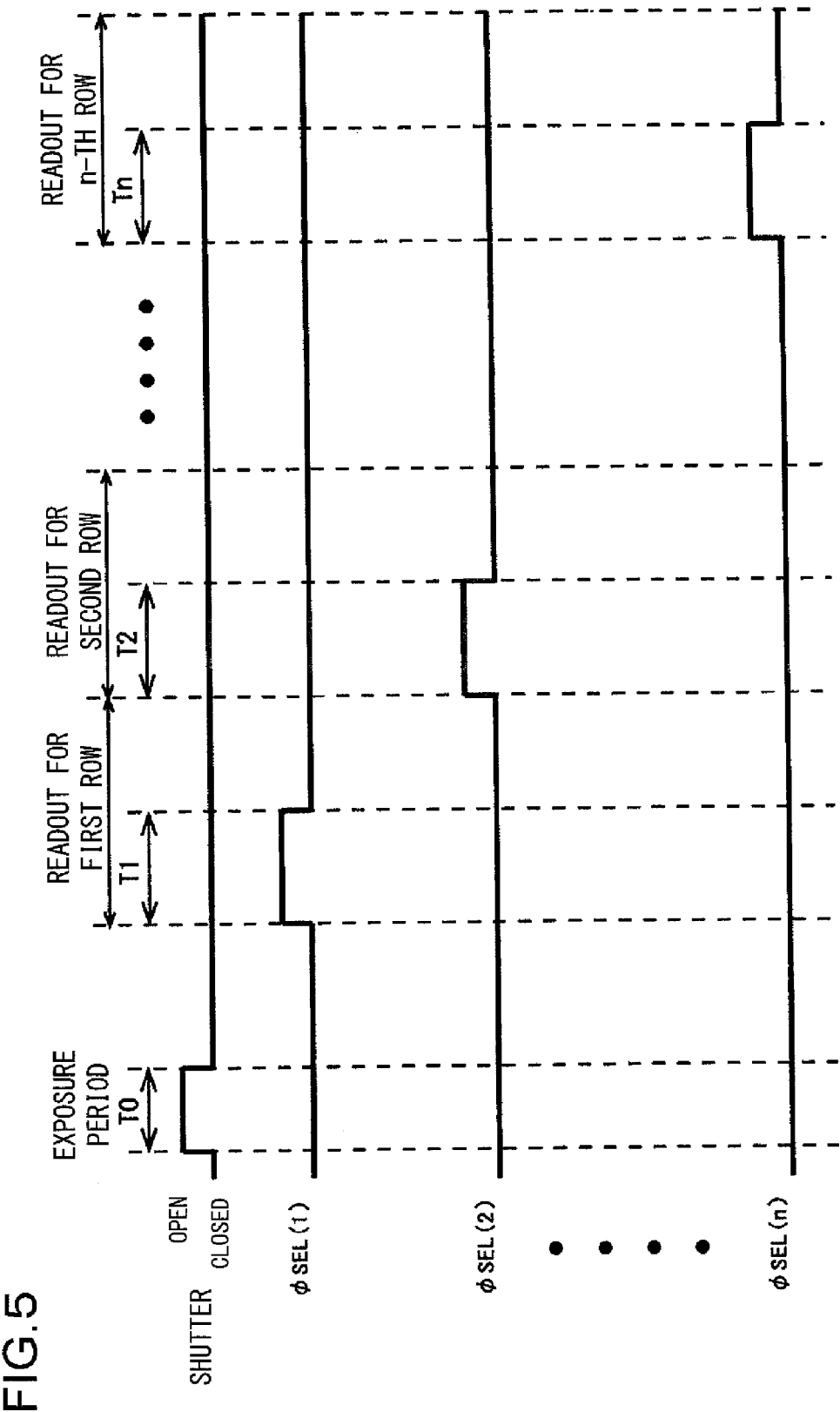
FIG. 5 is a timing chart showing an example of the operation of the solid-state image-capturing device shown in FIG. 1.

FIG. 5 is a timing chart showing an example of the operation of the solid-state image-capturing device 4 according to the present embodiment. When the operation is started, a mechanical shutter (not shown) is opened for a predetermined period (exposure period) T0. Subsequently, the readout period for the first row, the readout period for the second row, . . . , and the readout period for the n-th row are provided. That is to say, the readout operation is sequentially and repeatedly performed from the first row up to the last row. The readout period (each horizontal readout period) for each row is composed of a vertical transfer period for the applicable row (including the AD conversion period) and the subsequent horizontal transfer period (horizontal scanning period) for the applicable row. In FIG. 5, T1 represents the vertical transfer period in the readout period for the first row, T2 represents the vertical transfer period in the readout period for the second row, and Tn represents the vertical transfer period in the readout period for the n-th row. As shown in FIG. 5, during the vertical transfer period in the readout period for each row, the control signal φSEL for the applicable row is set to high level, which turns on the selector transistors SEL included in the pixels 21 of the applicable row.

FIG. 6 is a timing chart showing the operation of the vertical transfer period Tn of the n-th row readout period shown in FIG. 4. The vertical transfer period Tn begins at the time point t1, and ends at the time point t18.

During a period from the time point t1 up to the time point t2, the control signal φRES(n) is maintained at high level, which maintains the reset transistors RES of the pixels 21 of the n-th row in the on state. At the time point t2, the control signal φRES(n) is set to low level, which turns off the reset transistors RES of the pixels 21 of the n-th row. The off state of each reset transistor RES is maintained until the time point t16. During a period from the time point t2 up to the time point t3, the control signal φCARST is set to high level. After the time point t3, the control signal φCARST is set to low level. As a result, during a period from the time point t3 up to the time point t8 described later, the output signal of the amplifier 51 is configured as a dark signal Vd.

During a period from the time point t1 up to the time point t9, the ramp signal Vramp is set to the ground electric potential GND. Here, it will be readily understood that the ramp signal Vramp may be set to another constant electric potential instead of the ground electric potential GND.

During a period from the time point t4 up to the time point t7, the control signal φADC is set to high level, which turns on the feedback switch SW2. In this state, the comparator COM functions as a voltage follower. After the time point 7, the control signal φADC is set to low level, which turns off the feedback switch SW2. In this state, the comparator COM functions as a comparator. During a period from the time point t5 after the time point t4 up to the time point t6 before the time point t7, the control signal φSPL is set to high level, which turns on the sampling switch SW1. During a period until the time point t14 after the time point t6, the control signal φSPL is maintained at low level.

During a period from the time point t5 up to the time point t6, the sampling switch SW1 is turned on. In this state, the dark signal Vd output from the amplifier unit 51 is sampled and stored in the first capacitor C1, which supplies the dark signal Vd to the non-inverting input terminal of the comparator COM. The level of the dark signal Vd stored in the first capacitor C1 is fixed at the time point t6, and is maintained after the time point t6. Furthermore, during a period from the time point t5 up to the time point t7, the dark signal Vd is supplied to the non-inverting input terminal of the comparator COM that functions as a voltage follower. Thus, the dark signal Vd is also sampled by the second capacitor C2 via a path from the sampling switch SW1, through the comparator COM that functions as a voltage follower, and then to the feedback switch SW2. In this state, the dark signal (Vd+Voff) including the offset signal Voff of the comparator COM as a superimposed signal is stored in the capacitor C2, which supplies the dark signal (Vd+Voff) to the inverting input terminal of the comparator COM. The level of the dark signal (Vd+Voff) stored in the second capacitor C2 is fixed at the time point t7, and is also maintained after the time point t7.

During a period from the time point t8 up to the time point t10 after the time point t7, the control signal φTX(n) for the n-th row is temporarily set to high level, which turns on the transfer transistors TX of the pixels 21 of the n-th row. Thus, the output signal of the amplifier unit 51 is configured as the light signal Vs. In this period, each sampling switch SW1 is turned off. Thus, the output signal of the amplifier unit does not have an effect on the sampling state of the dark signal Vd stored in the capacitors C1 and C2.

At the time point t9 after the time point t7, the ramp signal Vramp is raised to a predetermined electric potential from the ground electric potential GND. During a period from the time point t9 up to the time point t11, the ramp signal Vramp is maintained at the predetermined electric potential. During a period from the time point t11 up to the time point t12, the ramp signal Vramp gradually drops in proportion to the elapsed time. The ramp signal Vramp at the time point t12 is maintained until the time point t13. At the time point t13, the ramp signal Vramp is returned to the initial electric potential, i.e., the ground electric potential GND. Subsequently, the ramp signal Vramp is maintained at the ground electric potential GND until the time point t16. It should be noted that the level of the ramp signal Vramp is raised at the time point t11 in order to provide high-precision AD conversion even if the dark signal Vd is in the vicinity of the zero level.

Description will be made below regarding a period from the time point t9 up to the time point t13 in which the ramp signal Vramp changes from the ground electric potential GND. In this period, the dark signal Vd is stored in the first capacitor C1. Thus, the non-inverting input terminal of the comparator COM is supplied with a superimposed signal (Vd Vramp) obtained by superimposing Vramp on Vd. On the other hand, the inverting input terminal of the comparator COM is supplied with a dark signal (Vd+Voff) obtained by superimposing Voff on Vd. At the time point at which the input signal of the non-inverting input terminal of the comparator COM matches the input signal of the inverting input terminal of the comparator COM, the output signal Vout of the comparator COM is inverted. Accordingly, at the time point at which the ramp signal Vramp matches the offset Voff, the output signal Vout of the comparator COM is inverted. Thus, the offset Voff is represented by the elapsed time from the time point t11 at which the ramp signal Vramp begins to change up to the time point at which the output signal Vout of the comparator COM is inverted. The count value that represents this elapsed time (i.e., the offset Voff) is stored in the latch A of the data storage unit 52.

The period t11 to t12 is configured as a first period in which the ramp signal Vramp gradually changes, which is a part of the period in which the sampling switch SW1 and the feedback switch SW2 of each column circuit 26 are turned off at the same time after they are temporarily turned on at the same time when the output signal of the amplifier unit 51 is configured as the dark signal Vd (accordingly, the signal that flows through the vertical signal line 23 is configured as the dark signal (reference signal)). The length of the first period t11 to t12 is designed such that the output signal Vout of the comparator COM is inverted in the first period t11 to t12 in a sure manner giving consideration to the possible range of the dark signal Vd, without being set to an unnecessarily long period.

During a period from the time point t14 up to the time point t15 after the time point 13, the control signal φSPL is set to high level, which turns on the sampling switch SW1. After the time point t15, the control signal φSPL is maintained at low level.

During a period t4 to t15, the sampling switch SW1 is on. In this state, the light signal Vs output from the amplifier unit 51 is sampled and stored in the first capacitor C1. The level of the light signal Vs stored in the first capacitor C1 is fixed at the time point t15, and the level thus fixed is also maintained after the time point t15. On the other hand, the dark signal (Vd+Voff) including the offset Voff of the comparator COM as a superimposed component remains stored in the second capacitor C2, and remains in a state of being supplied to the inverting input terminal of the comparator COM.

The ramp signal Vramp is raised from the ground electric potential GND to a predetermined electric potential at the time point t16 after the time point t15, is maintained at this predetermined electric potential during a period from the time point t6 up to the time point t17, decreases in proportion to the elapsed time during a period from the time point t17 up to the time point t18, and is returned to the initial electric potential, i.e., the ground electric potential GND at the time point 118. It should be noted that the level of the ramp signal Vramp is raised at the time point t17 in order to provide high-precision AD conversion even if the dark signal Vd is in the vicinity of the zero level.

Description will be made below regarding a period t16 to t18 in which the ramp signal Vramp changes from the ground electric potential GND. In this period, the light signal Vs is stored in the first capacitor C1. Thus, the non-inverting input terminal of the comparator COM is supplied with a superimposed signal (Vs+Vramp) obtained by superimposing the ramp signal Vramp on the light signal Vs. On the other hand, the inverting input terminal of the comparator COM is supplied with a dark signal (Vd+Voff) obtained by superimposing the offset Voff on Vd. At the time point at which the input signal of the non-inverting input terminal of the comparator COM matches the input signal of the inverting input terminal of the comparator COM, the output signal Vout of the comparator COM is inverted. Accordingly, at the time point at which the ramp signal Vramp matches (Vd−Vs+Voff), the output signal Vout of the comparator COM is inverted. Thus, (Vd−Vs+Voff) is represented by the elapsed time from the time point t17 at which the ramp signal Vramp begins to change up to the time point at which the output signal Vout of the comparator COM is inverted. The count value that represents this elapsed time (i.e., (Vd−Vs+Voff)) is stored in the latch B of the data storage unit 52.

The period t17 to t18 is configured as a second period in which the ramp signal Vramp gradually changes, which is a part of a period in which the sampling switch SW1 of each column circuit 26 is turned off after the sampling switch SW1 is temporarily turned on during a period t14 to t15 while the feedback switch SW2 of each column circuit 26 is maintained in the off state when the output signal of the amplifier unit 51 is configured as the light signal Vs (accordingly, the signal that flows through the vertical signal line 23 is configured as the light signal). The length of the second period t17 to t18 is designed such that the output signal Vout of the comparator COM is inverted in the second period t17 to t18 in a sure manner giving consideration to the possible range of the light signal Vs, without being set to an unnecessarily long period.

Following the end of the vertical transfer period Tn of the readout period for the n-th row, the period transits to the horizontal transfer period of the readout period for the n-th row. In the horizontal transfer period, the horizontal scanning circuit 30 performs a horizontal scanning operation according to a control signal received from the control pulse generating circuit 29, so as to instruct the data storage unit 52 (described later) of the column circuit 26 for each column circuit 26 to sequentially transmit the first and second count values respectively stored in the latch A and the latch B to the subtracter 31 via the first and second horizontal signal lines 34 and 35 each configured as an m-bit signal line. The subtracter 31 calculates the difference between the first and second digital values thus received (which corresponds to the difference between the light signal Vs and the dark signal Vd), generates a m-bit digital value which represents the difference thus calculated, and transmits the m-bit digital value thus obtained to the output circuit 32. The output circuit 32 converts the digital value thus received into a signal in a predetermined signal format, and outputs the signal thus converted as image data to an external circuit (digital signal processing unit 6 shown in FIG. 1).

Also, the subtracter 31 may be omitted. In this case, an arrangement may be made in which the first and second digital values are output to the digital signal processing unit 6 shown in FIG. 1 via the output circuit 32, and the digital signal processing unit 6 calculates the difference between the first and second digital values.

Though description has been made above regarding the readout period for the n-th row, the operation in the readout period for other rows is the same as that for the n-th row.

Description has been made above regarding an example operation in which the readout operation for each row is sequentially performed such that the readout period (horizontal readout period) for each row does not overlap any of the readout periods for the other rows. However, the present invention is not restricted to such an arrangement. Also, an arrangement may be made in which the readout period for a given row partially overlaps the readout period for the next row. In this case, for example, in FIG. 6, the control signal φSEL(n) may be set to low level after the time point t16, and the readout period for the next row, i.e., the (n+1)-th row, may be started after a certain period elapses from the time point t16.

With the present embodiment, as shown in FIG. 2, the ramp signal generating circuit 27 is arranged on one side (the left side in FIG. 2) along the row direction in the solid-state image-capturing device 4 and the ramp signal Vramp is supplied to the side, which is shown as the left side in FIG. 2, of the first line 61 which is a common connection line that connects the aforementioned other electrode (first input terminal) of the first capacitor C1 of each column circuit 26. Furthermore, with the present embodiment, the reference voltage GND is supplied to the side, which is shown as the left side in FIG. 2, of the second line 62 which is a common connection line that connects the aforementioned other electrode (second input terminal) of the second capacitor C2, and is not supplied to the other side, which is shown as the right side in FIG. 2, of the second line 62.

Figure 7:
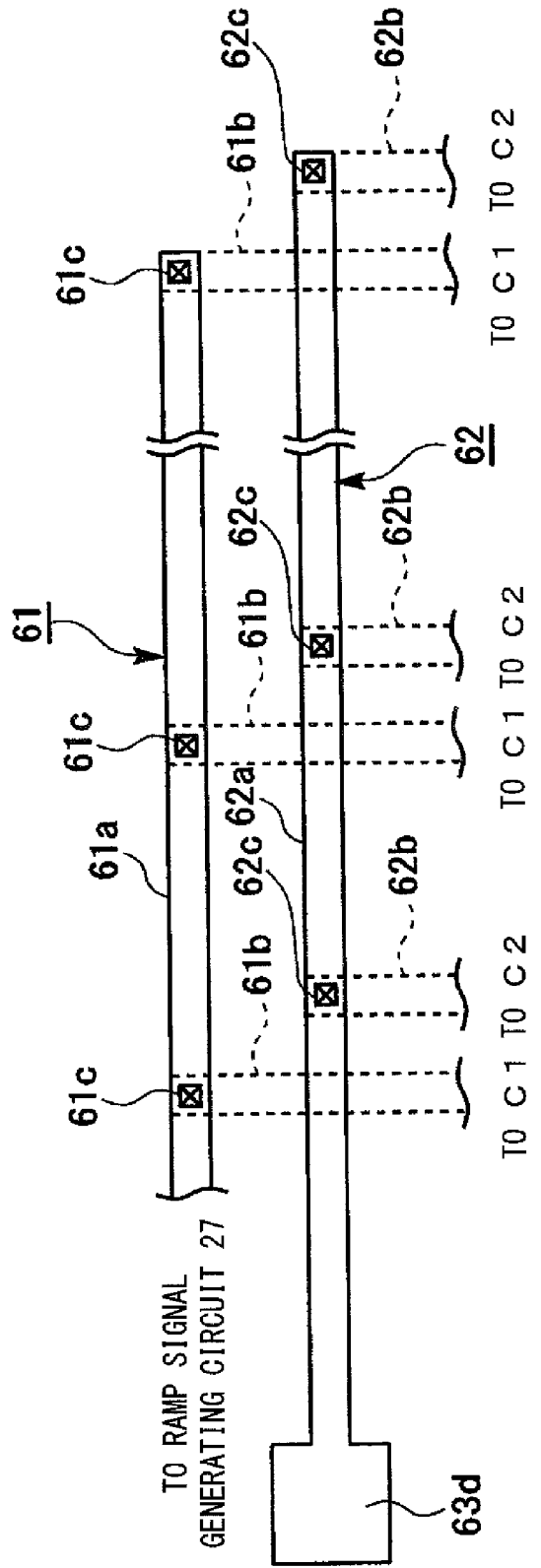
FIG. 7 is a schematic plan view showing a schematic configuration of a specific example of wiring patterns and the like that form a first line and a second line shown in FIG. 2.

FIG. 7 is a schematic plan view showing a schematic configuration of a specific example of the wiring patterns 61a, 61b, 62a, 62b, and the like, that form the first line 61 and the second line 62 shown in FIG. 2. The left side and the right side shown in FIG. 7 match the left side and the right side shown in FIG. 2, respectively. The horizontal direction shown in FIG. 7 matches the row direction of the pixels 21.

In the example shown in FIG. 7, the first line 61 consists of a main wiring pattern 61a that extends along the row direction (horizontal direction in FIG. 7); and sub-wiring patterns 61b each connected to the main wiring pattern 61a via a contact portion 61c, and each configured such that it extends along the column direction (vertical direction in FIG. 7) such that it is connected to the first capacitor C1 of the corresponding column circuit 26. It should be noted that each sub-wiring pattern 61b is formed in a layer that differs from a layer in which the main wiring pattern 61a is formed. Thus, in FIG. 7, the sub-wiring patterns 61b are represented by broken lines. The left side of the main wiring pattern 61a shown in FIG. 7 is connected to the ramp signal generating circuit 27. That is to say, the ramp signal Vramp is supplied to the left side of the main pattern 61a shown in FIG. 7.

In the example shown in FIG. 7, the second line 62 consists of a main wiring pattern 62a that extends along the row direction (horizontal direction in FIG. 7); and sub-wiring patterns 62b each connected to the main wiring pattern 62a via a contact portion 62c, and each configured such that it extends along the column direction (vertical direction in FIG. 7) such that it is connected to the second capacitor C2 of the corresponding column circuit 26. It should be noted that each sub-wiring pattern 62b is formed in a layer that differs from a layer in which the main wiring pattern 62a is formed. Thus, in FIG. 7, the sub-wiring patterns 62b are represented by broken lines. The left side of the main wiring pattern 62a shown in FIG. 7 is connected to an electrode pad 63d for supplying the ground voltage GND. Thus, the reference voltage GND is supplied to the left side of the main wiring pattern 62a in FIG. 7. In contrast, no electrode pad is connected to the right side of the main wiring pattern 62a in FIG. 7.

Figure 8:
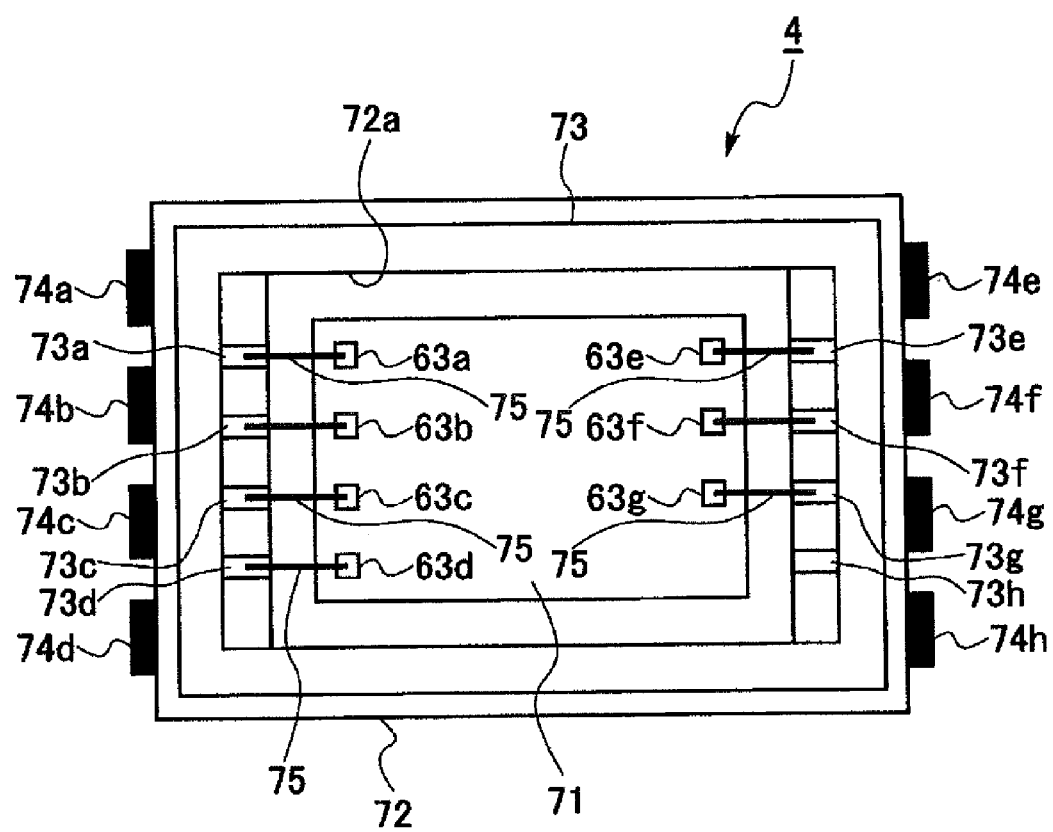
FIG. 8 is a schematic plan view showing a schematic configuration of the solid-state image-capturing device shown in FIG. 1.

FIG. 8 is a schematic plan view showing a schematic configuration of the solid-state image-capturing device 4 shown in FIG. 1 (i.e., the solid-state image-capturing device 4 shown in FIG. 2). The solid-state image-capturing device 4 includes: a chip 71 containing the circuit shown in FIG. 2; a recess-shaped package main body 72 having an opening 72a and housing the chip 71; and a cover 73 having predetermined light transmission characteristics and configured to seal the opening 72a.

As shown in FIG. 8, electrode pads 63a through 63g are formed on the chip 71. The electrode pad 63d shown in FIG. 8 corresponds to the electrode pad 63d shown in FIG. 7 for supplying the ground voltage GND.

The package main body 72 includes internal terminals 73a through 73h, and external terminals 74a through 74h electrically connected to the internal terminals 73a through 73h in a one-to-one manner. The internal terminals 73a through 73g are electrically connected via bonding wire 75 to the electrode pads 63a through 63g, respectively, formed on the chip 71. In the present example, the internal terminal 73h and the external terminal 74h are configured as backup terminals, and are not used. It is needless to say that the internal terminal 73h and the external terminal 74h may be configured to transmit/receive a given signal to/from an external circuit.

Figure 9:
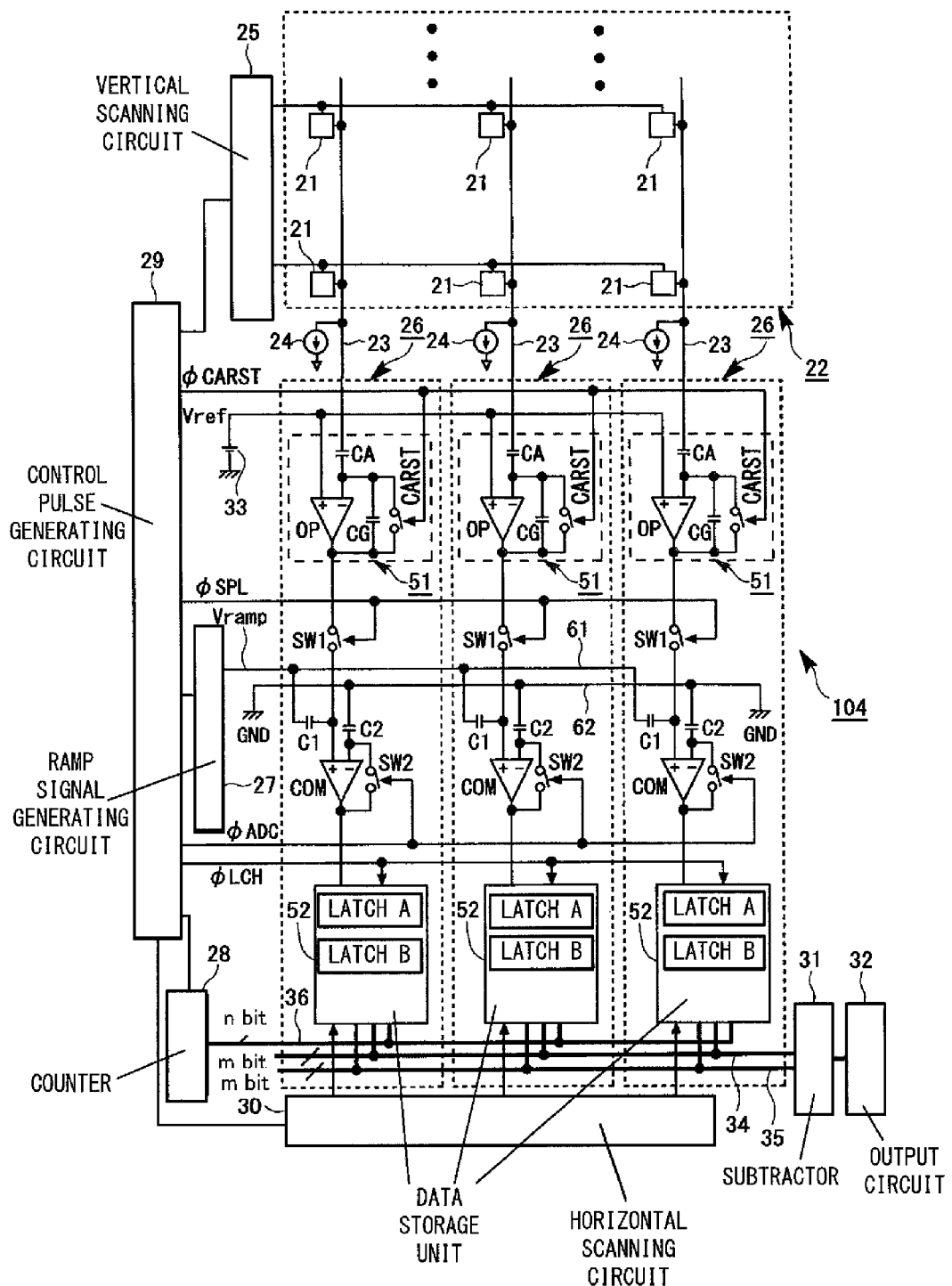
FIG. 9 is a circuit diagram showing a schematic configuration of a solid-state image-capturing device according to a comparison example.
Figure 10:
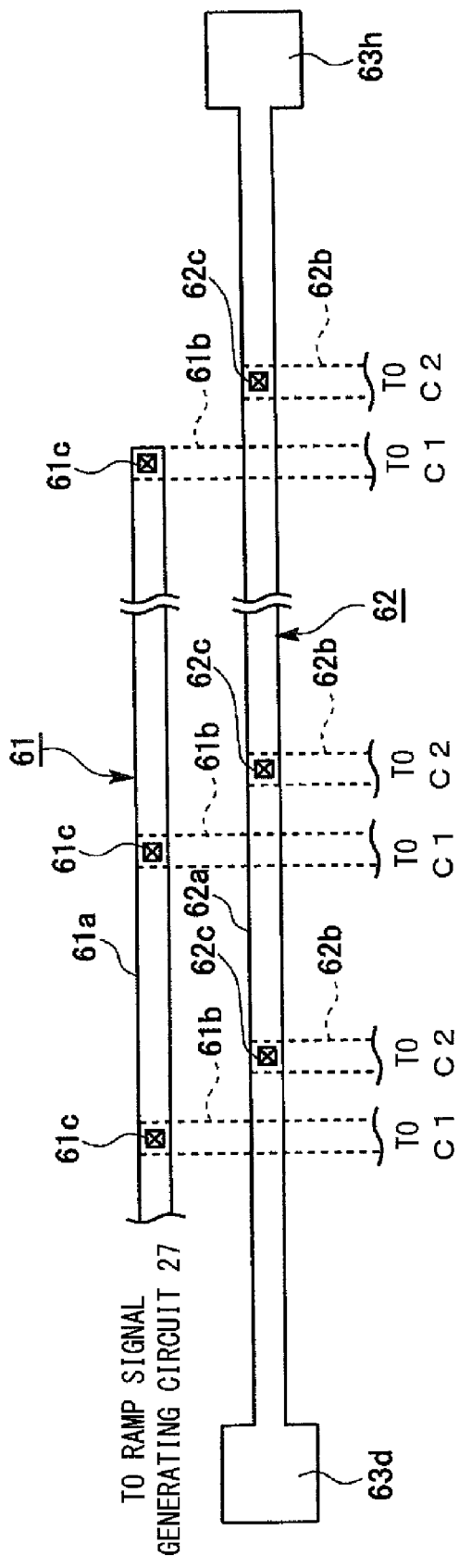
FIG. 10 is a schematic plan view showing a schematic configuration of wiring patterns and the like that form a first line and a second line shown in FIG. 9.
Figure 11:
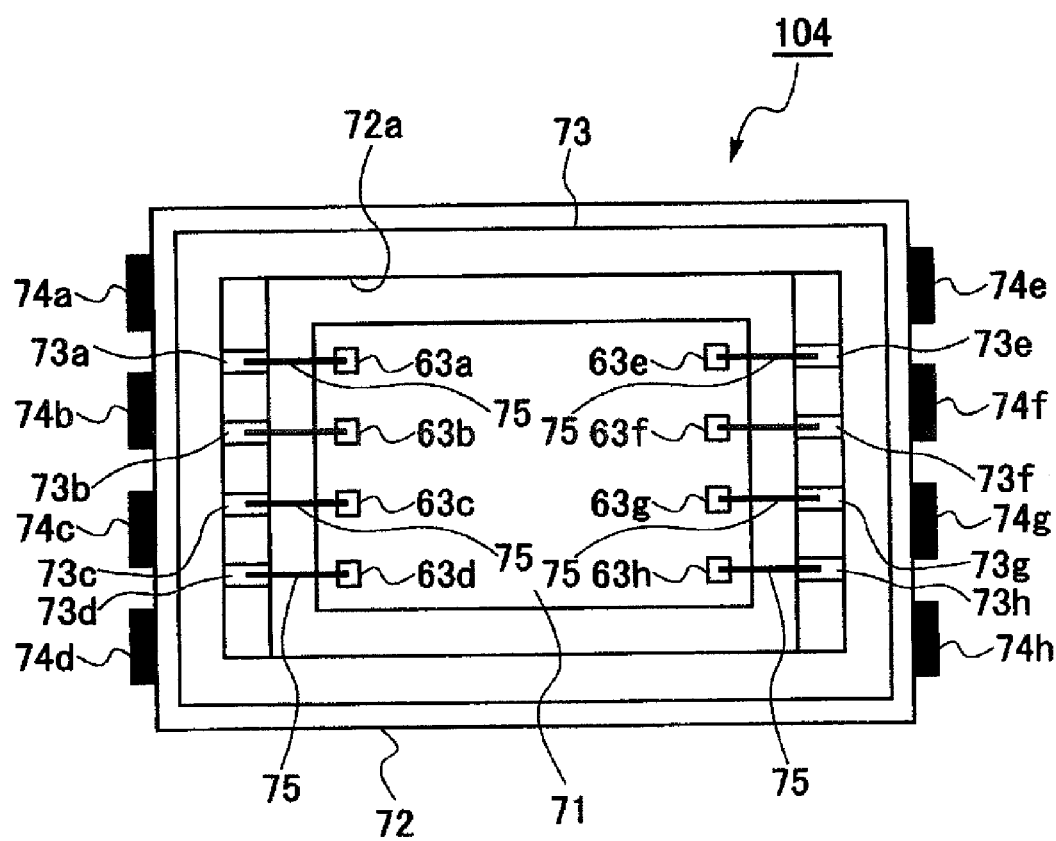
FIG. 11 is a schematic plan view showing a schematic configuration of the solid-state image-capturing device according to the comparison example shown in FIG. 9.

FIG. 9 is a circuit diagram showing a schematic configuration of the solid-state image-capturing device 104 according to a comparison example, which corresponds to the configuration shown in FIG. 2. FIG. 10 is a schematic plan view showing a schematic configuration of the wiring patterns 61a, 61b, 62a, 62b, and the like, that form the first line 61 and the second line 62 shown in FIG. 9, which corresponds to the configuration shown in FIG. 7. FIG. 11 is a schematic plan view showing a schematic configuration of the solid-state image-capturing device 104 according to the comparison example shown in FIG. 9, which corresponds to the configuration shown in FIG. 8. In FIGS. 9 through 11, the same components as those shown in FIGS. 2, 7, and 8 and the corresponding components are denoted by the same reference symbols, and redundant description thereof will be omitted.

Description will be made below regarding the point of difference between the solid-state image-capturing device 104 according to the comparison example and the solid-state image-capturing device 4 according to the present embodiment.

As shown in FIGS. 2 and 9, in the solid-state image-capturing device 4 according to the present embodiment, the right side of the second line 62 shown in FIG. 2 is not supplied with the reference voltage GND. In contrast, in the solid-state image-capturing device 104 according to the comparison example, the right side of the second line 62 shown in FIG. 9 is also supplied with the reference voltage GND, in addition to the left side of the second line 62 shown in FIG. 9, in order to provide improved noise tolerance of the second line 62.

In order to provide such an arrangement, as shown in FIGS. 7 and 10, in the solid-state image-capturing device 4 according to the present embodiment, the right side of the main wiring pattern 62a of the second line 62 shown in FIG. 7 is not connected to an electrode pad. In contrast, in the solid-state image-capturing device 104 according to the comparison example, the right side of the main wiring pattern 62a of the second line 62 shown in FIG. 7 is connected to an electrode pad 63h to which the ground voltage GND is supplied. Furthermore, as shown in FIGS. 8 and 9, in the solid-state image-capturing device 4 according to the present embodiment, such an electrode pad 63h is not provided to the chip 71. In addition, the internal terminal 73h and the external terminal 74 are configured as backup terminals and are not used. In contrast, in the solid-state image-capturing device 104 according to the comparison example, the electrode pad 63h is provided to the chip 71, and the electrode pad 63h and the internal terminal 73h are electrically connected to each other via a bonding wire 75, which allows the ground voltage GND to be supplied to the electrode pad 63h via the internal terminal 73h from the external terminal 74h.

With both the configuration according to the comparison example and the configuration according to the present embodiment, the left side of the first terminal 61 shown in the drawing is supplied with the ramp signal Vramp from the ramp signal generating circuit 27. Thus, if a noise component is input to the first line 61 due to disturbance or the like, the noise level is relatively small on the left side of the first line 61 shown in the drawing. The noise level is relatively large on the right side of the first line 61 shown in the drawing. And the noise level is moderate in the central region of the first line 61 along the horizontal direction in the drawing.

With the comparison example, the reference voltage GND is supplied to both sides, i.e., the left side and the right side of the second line 62 shown in the drawing. Accordingly, if a noise component is input to the second line 62 due to disturbance or the like, the noise level is relatively small on the left side of the second line 62 shown in the drawing. Also, the noise level is relatively small on the right side of the second line 62 shown in the drawing. And the noise level is moderate in the central region of the second line 62 along the horizontal direction in the drawing. Accordingly, with the comparison example, there is a difference in the noise level distribution between the second line 62 and the first line 61. And there is a great difference in the noise level on the right side in the drawing between the first line 61 and the second line 62. Thus, with the comparison example, in the column circuits 26 provided for the columns on the right side in the drawing, there is a great difference between the noise level superimposed on the ramp signal Vramp and the noise level superimposed on the reference voltage GND. This leads to a great difference between the noise levels respectively superimposed on two signals that are compared with each other by the comparator COM for AD conversion (the signal input to the non-inverting input terminal of the comparator COM and the signal input to the inverting input terminal of the comparator COM). Thus, with the comparison example, in the column circuits 26 for the columns on the right side in the drawing, such an arrangement leads to an increase in error of the comparison result obtained by the comparator COM for AD conversion, resulting in an increase in AD conversion error. As a result, vertical artifacts occur in an acquired image due to the noise effects, leading to degradation of the image quality.

In contrast, with the present embodiment, the reference voltage GND is supplied to the left side of the second line 62 shown in the drawing, and is not supplied to the right side thereof. Accordingly, if a noise component is input to the second line 62 due to disturbance or the like, the noise level is relatively small on the left side of the second line 62 shown in the drawing. The noise level is relatively large on the right side of the second line 62 shown in the drawing. The noise level is moderate in the central region of the second line 62 along the horizontal direction in the drawing. Accordingly, with the present embodiment, the noise level distribution that occurs in the second line 62 is the same as that in the first line 61. That is to say, there is only a small difference between the noise level that occurs in the first line 61 and the noise level that occurs in the second line 62 not only on the left side and in the central region along the horizontal direction, but also on the right side in the drawing. Thus, with the present embodiment, in the column circuits 26 for all the columns in the drawing, such an arrangement provides a reduced difference between the noise levels respectively superimposed on two signals that are compared with each other by the comparator COM for AD conversion (the signal input to the non-inverting input terminal of the comparator COM and the signal input to the inverting input terminal of the comparator COM). Thus, with the present embodiment, in all the column circuits 26 for all the columns, such an arrangement provides a reduced difference between the noise level superimposed on the ramp signal Vramp and the noise level superimposed on the reference voltage GND. This provides a reduced error of the comparison result obtained by the comparator COM for AD conversion, thereby providing a reduction in the AD conversion error. As a result, with the present embodiment, such an arrangement reduces vertical artifacts that can occur due to noise, thereby providing improved image quality.

Figure 12:
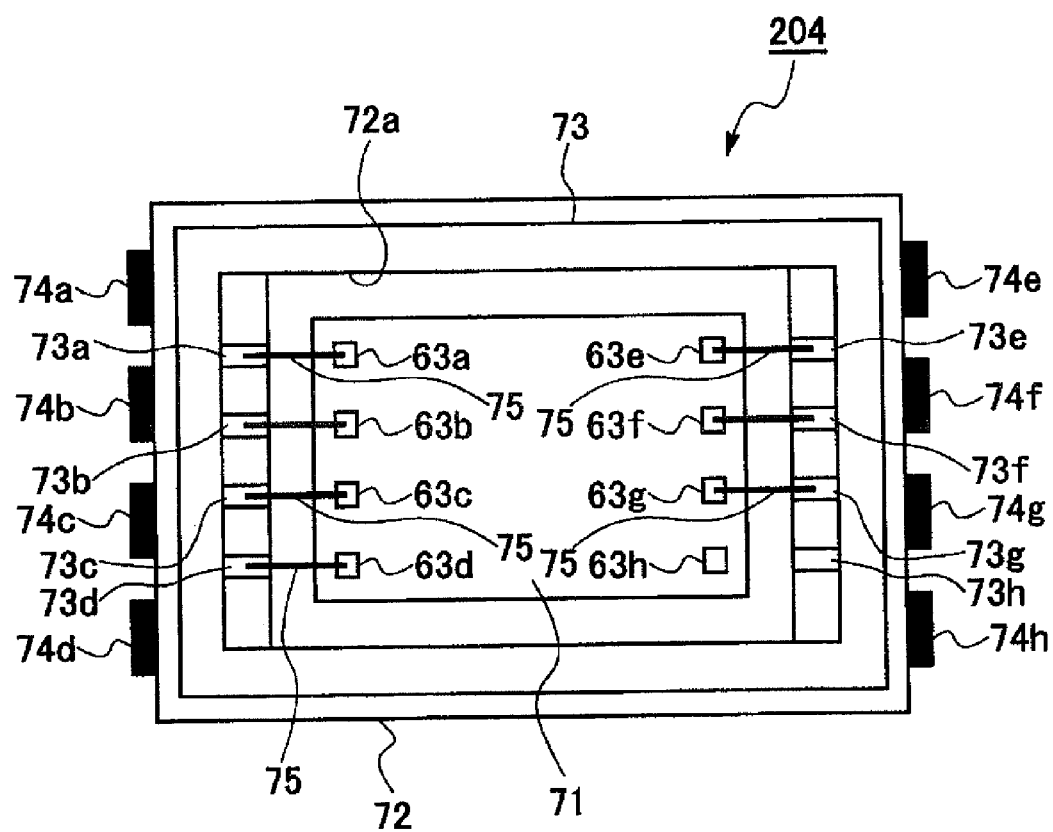
FIG. 12 is a schematic plan view showing a schematic configuration of a solid-state image-capturing device according to a modification.

FIG. 12 is a schematic plan view showing a schematic configuration of a solid-state image-capturing device 204 according to a modification, which can be employed as an alternative to the solid-state image-capturing device 4 according to the present embodiment, and corresponds to FIGS. 8 and 11.

The solid-state image-capturing device 204 has the same configuration as that of the solid-state image-capturing device 104 according to the comparison example except for the omission of the bonding wire 75 that connects the electrode pad 63h and the internal terminal 73h. The solid-state image-capturing device 204 having such a configuration allows the reference voltage GND to be supplied to the second line 62 in the same state as shown in FIG. 2.

Also, according to the method of use of the present invention, the solid-state image-capturing device 104 according to the comparison example may also be employed as an alternative to the solid-state image-capturing device 4. That is to say, in a case in which the solid-state image-capturing device 104 according to the comparison example is employed, on the circuit board, etc., configured to mount the solid-state image-capturing device 4, setting the external terminal 74h to an electrically floating state without connection to a portion to which the reference voltage GND is supplied, i.e., the external terminal 74h is set to an electrically floating state can allow the reference voltage GND to be supplied to the second line 62 in the same state as shown in FIG. 2.

[Second Embodiment]

Figure 13:
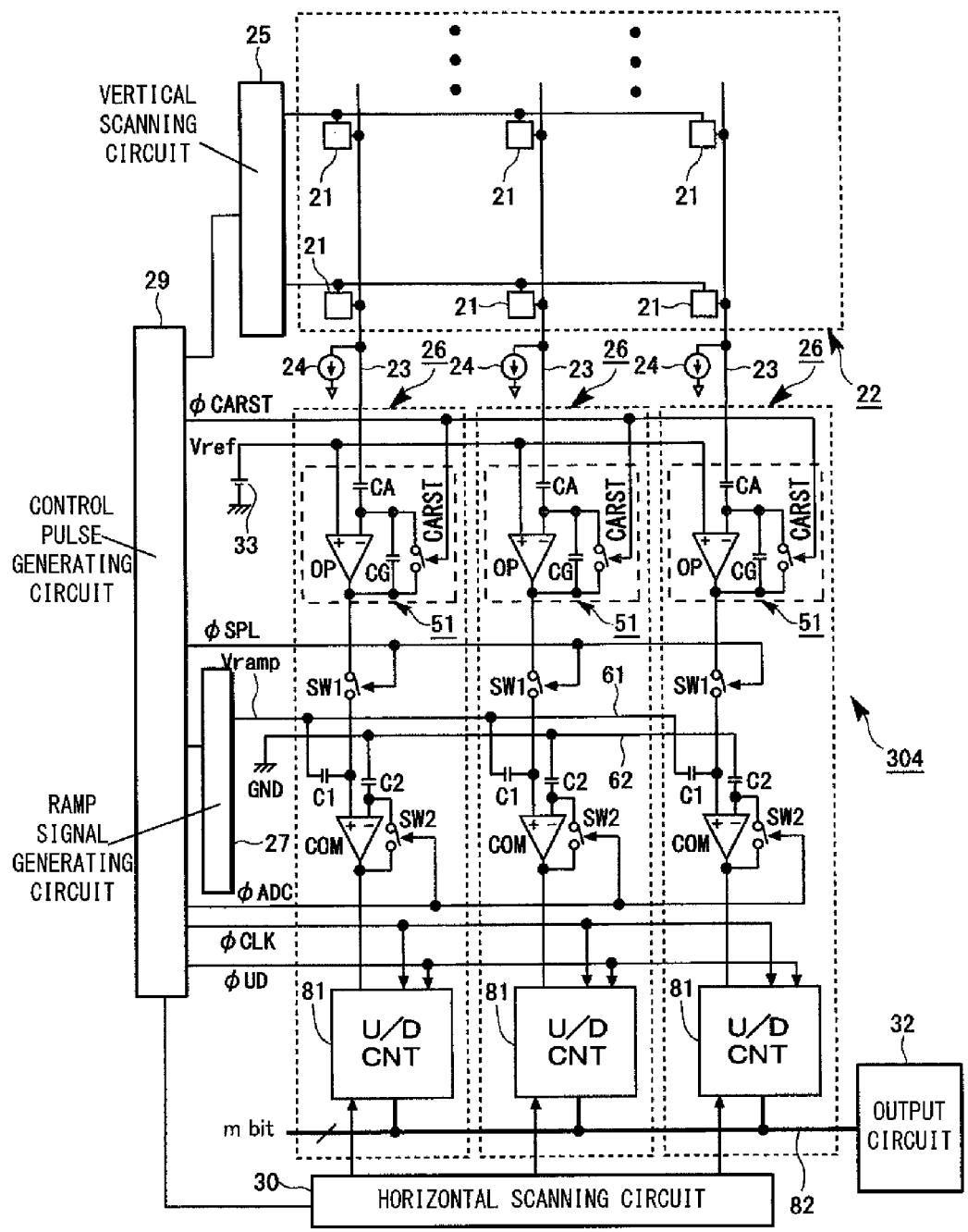
FIG. 13 is a circuit diagram showing a schematic configuration of a solid-state image-capturing device employed in an electronic camera according to a second modification of the present invention.

FIG. 13 is a circuit diagram showing a schematic configuration of a solid-state image-capturing device 304 employed in an electronic camera according to a second embodiment of the present invention, which corresponds to the configuration shown in FIG. 2. In FIG. 13, components that are the same as or corresponding to those shown in FIG. 2 are denoted by the same reference symbols, and redundant description thereof will be omitted.

The point of difference between the electronic camera according to the present embodiment and the electronic camera 1 according to the first embodiment is that the solid-state image-capturing device 304 is employed instead of the solid-state image-capturing device 4. Description will be made below regarding the point of difference between the solid-state image-capturing device 304 and the solid-state image-capturing device 4.

As shown in FIG. 13, the solid-state image-capturing device 304 includes an up/down counter 81 for each column circuit 26 shown in FIG. 2, instead of the data storage unit 52. Furthermore, the counter 28 and the subtracter 31 are omitted, and a horizontal signal line 82 is provided instead of the horizontal signal lines 34 and 35.

In the present embodiment, the up/down counter 81 of each column circuit 26 receives, as an input signal from the control pulse generating circuit 29, a control signal φUD for indicating whether the up/down counter 81 is to operate in the down count mode or is to operate in the up count mode. Furthermore, the up/down counter 81 receives a count clock φCLK as an input signal from the control pulse generating circuit 29. The control signal φUD and the count clock φCLK are respectively input in common to the up/down counters 81 of the respective column circuits 26. Furthermore, the up/down counter 81 receives the output signal of the corresponding comparator COM as an input signal.

In the vertical transfer period Tn of the readout period for the n-th row, during a period from the time point t11 at which the ramp signal Vramp begins to change in the first period t11 to t12 up to the time point at which the output signal Vout of the comparator COM is inverted in the first period t11 to t12, the up/down counter 81 counts the count clock φCLK in one mode among the down count mode or the up count mode, and holds the count value at the time point of the output voltage inversion. Furthermore, in the vertical transfer period Tn of the readout period for the n-th row, during a period from the time point t17 at which the ramp signal Vramp begins to change in the second period t17 to t18 up to the time point at which the output signal Vout of the comparator COM is inverted in the second period t17 to t18, the up/down counter 81 counts the count clock φCLK starting from the count value held in the previous step in the other mode among the down count mode and the up count mode, and holds the count value at the time point of the output voltage inversion. The count value thus held is equivalent to the difference between the count value stored in the latch A of the data storage unit 52 and the count value stored in the latch B of the data storage unit 52 as described in the first embodiment.

Following the end of the vertical transfer period Tn in the readout period for the n-th row, the period transits to the horizontal transfer period in the readout period for the n-th row. In the horizontal transfer period, the horizontal scanning circuit 30 performs a horizontal scanning operation according to a control signal from the control pulse generating circuit 29, and sequentially transmits the count value held by the up/down counter 81 of the column circuit 26 provided for each column to the output circuit 32 via the m-bit horizontal signal line 82. The output circuit 32 converts the digital values thus received into a signal in a predetermined signal format, and outputs the signal thus converted as image data to an external circuit (digital signal processing unit 6 shown in FIG. 1).

Description has been made above regarding the readout period for the n-th row. The operation in the readout period for other rows is the same as that for the n-th row.

The present embodiment also provides the same advantages as those provided by the aforementioned first embodiment.

It should be noted that the same modifications may be applied to the solid-state image-capturing device 304 according to the present embodiment as those applied to the solid-state image-capturing device 4.

Description has been made above regarding the embodiments and modifications thereof according to the present invention. However, the present invention is not restricted to such arrangements. Rather, other embodiments which are conceivable within the technical scope of the present invention are also encompassed within the technical scope of the present invention.

For example, with the first embodiment and the second embodiment described above, a simple inverting amplifier may be employed instead of the amplifier unit 51 provided for each column circuit 26. Also, the amplifier unit 51 may be omitted in each column circuit 26, and each vertical signal line 23 may be directly connected to the corresponding sampling switch SW1.

The entire contents disclosed in Japanese Patent Application No. 2012-042293 (filed on Feb. 28, 2012) are incorporated herein by reference.

The invention claimed is:

1. A solid-state image-capturing device, comprising:
 a plurality of pixels arranged in a two-dimensional manner;
 a plurality of vertical signal lines each provided for a corresponding column of the plurality of pixels, and each configured to receive a signal from pixels of a corresponding column;
 a plurality of signal processing units each configured to process a signal of one of the plurality of vertical signal lines based on a ramp signal and a reference voltage;
 a first line configured as a common line that connects first input units of the plurality of signal processing units each configured to receive the ramp signal, and configured such that the ramp signal is supplied to one side of the first line along a row direction;
 a second line configured as a common line that connects second input units of the plurality of signal processing units each configured to receive the reference voltage, and configured such that the reference voltage is supplied to one side of the second line along the row direction and the reference voltage is not supplied to another side of the second line along the row direction.

2. The solid-state image-capturing device according to claim 1, wherein:
 each of the signal processing units comprises a comparator that performs comparison processing based on the ramp signal and the reference voltage.

3. The solid-state image-capturing device according to claim 2, wherein:
 the comparator includes an operational amplifier; and
 each of the signal processing units comprises
 a sampling switch that is connected to a non-inverting input terminal of the comparator, and that samples a signal of the vertical signal line or a signal corresponding thereto,
 a first capacitor one electrode of which is connected to the non-inverting input terminal and another electrode of which functions as the first input unit,
 a second capacitor one electrode of which is connected to an inverting input terminal of the comparator and another electrode of which functions as the second input unit, and
 a feedback switch that connects and disconnects the inverting input terminal and an output terminal of the comparator.

4. The solid-state image-capturing device according to claim 3, wherein:
 in a first period in which the signals of the plurality of vertical signal lines are each configured as a reference signal, and the sampling switch and the feedback switch of each of the signal processing units are turned off at the same time after being temporarily turned on at the same time, the ramp signal gradually changes;
 in a second period after the first period, in which the signals of the plurality of vertical signal lines are each configured as a light signal including light information obtained by photoelectric conversion provided by at least one pixel of the plurality of pixels, and the sampling switch of each of the signal processing units is turned off after being temporarily turned on while the feedback switch of each of the signal processing units is maintained off, the ramp signal gradually changes; and
 there is provided a time measurement unit that acquires a count value that corresponds to an elapsed time from a time point at which the ramp signal begins to change in the first period up to a time point at which a signal of an output unit of the comparator of each of the signal processing units is inverted in the first period and that acquires a count value that corresponds to an elapsed time from a time point at which the ramp signal begins to change in the second period up to a time point at which the signal of the output unit of the comparator of each of the signal processing units is inverted in the second period.

5. The solid-state image-capturing device according to claim 4, wherein the time measurement unit comprises:
 a counter that counts a clock signal from a time point at which the ramp signal begins to change in the first period, and that counts the clock signal from a time point at which the ramp signal begins to change in the second period; and
 storage units, each provided to each of the signal processing units, and each configured to receive the count value of the counter, to store the count value at a time point at which a signal of an output unit of the comparator is inverted in the first period, and to store the count value at a time point at which the signal of the output unit of the comparator is inverted in the second period.

6. The solid-state image-capturing device according to claim 3, wherein:
   in a first period in which the signals of the plurality of vertical signal lines are each configured as a reference signal, and the sampling switch and the feedback switch of each of the signal processing units are turned off at the same time after being temporarily turned on at the same time, the ramp signal gradually changes;
   in a second period after the first period, in which the signals of the vertical signal lines are each configured as a light signal including light information obtained by photoelectric conversion provided by at least one pixel of the plurality of pixels, and the sampling switch of each of the signal processing units is turned off after being temporarily turned on while the feedback switch of each of the signal processing units is maintained off, the ramp signal gradually changes; and
   each of the signal processing units comprises a counter that acquires a count value by performing a count operation in one mode among a down mode and an up mode during a period from a time point at which the ramp signal begins to change in the first period up to a time point at which a signal of an output unit of the comparator of each of the signal processing units is inverted in the first period, and that performs a count operation starting from the count value in another mode among the down mode and the up mode during a period from a time point at which the ramp signal begins to change in the second period up to a time point at which the signal of the output unit of the comparator of each of the signal processing units is inverted in the second period.

7. The solid-state image-capturing device according to claim 3, wherein:
   each of the signal processing units includes an amplifier unit between the vertical signal line and the sampling switch.

8. The solid-state image-capturing device according to claim 7, wherein the amplifier unit comprises:
   a second operational amplifier;
   an input capacitor connected to an inverting input terminal of the second operational amplifier;
   a second feedback switch that connects and disconnects the inverting input terminal of the second operational amplifier and an output terminal of the second operational amplifier; and
   a feedback capacitor connected between the inverting input terminal of the second operational amplifier and the output terminal of the second operational amplifier.

9. An electronic camera comprising the solid-state image-capturing device according to claim 1.

* * * * *